(12) United States Patent
Chu et al.

(10) Patent No.: US 9,407,347 B2
(45) Date of Patent: Aug. 2, 2016

(54) UPLINK MULTI-USER MULTIPLE INPUT MULTIPLE OUTPUT BEAMFORMING

(71) Applicant: Marvell World Trade Ltd., St. Michael (BB)

(72) Inventors: Liwen Chu, San Ramon, CA (US); Hongyuan Zhang, Fremont, CA (US); Hui-Ling Lou, Sunnyvale, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

(21) Appl. No.: 14/755,722

(22) Filed: Jun. 30, 2015

(65) Prior Publication Data
US 2015/0304007 A1 Oct. 22, 2015

Related U.S. Application Data

(62) Division of application No. 14/554,497, filed on Nov. 26, 2014, now Pat. No. 9,166,660.

(60) Provisional application No. 61/909,598, filed on Nov. 27, 2013.

(51) Int. Cl.
| | |
|---|---|
| *H04B 7/06* | (2006.01) |
| *H04B 7/04* | (2006.01) |
| *H04W 56/00* | (2009.01) |

(52) U.S. Cl.
CPC ............ *H04B 7/0617* (2013.01); *H04B 7/0417* (2013.01); *H04B 7/0421* (2013.01);
(Continued)

(58) Field of Classification Search
CPC .. H04B 7/0421; H04B 7/0619; H04B 7/0452; H04B 7/0417; H04B 7/0456; H04B 7/0617; H04B 7/0634; H04W 56/0005; H04W 56/0015

USPC ................ 375/295, 316, 259; 370/395.4, 329
See application file for complete search history.

(56) References Cited

U.S. PATENT DOCUMENTS

| | | | |
|---|---|---|---|
| 5,933,787 | A | 8/1999 | Gilhousen et al. |
| 6,175,743 | B1 | 1/2001 | Alperovich et al. |

(Continued)

FOREIGN PATENT DOCUMENTS

| | | |
|---|---|---|
| EP | 907263 | 4/1999 |
| EP | 1168877 | 1/2002 |

(Continued)

OTHER PUBLICATIONS

IEEE Std 802.16™-2012 (Revision of IEEE Std. 802.16-2009), IEEE Standard for Air Interface for Broadband Wireless Access Systems: Part 1—Beginning through Section 7, IEEE Computer Society and the IEEE Microwave Theory and Techniques Society, *The Institute of Electrical and Electronics Engineers, Inc.*, 2558 pages (Aug. 17, 2012).

(Continued)

*Primary Examiner* — Vineeta Panwalkar

(57) ABSTRACT

As part of a beamforming training procedure, a first communication device transmits a beamforming training packet. The first device then receives a plurality of respective beamforming feedback packets from a plurality of second communication devices. The first device then uses the plurality of beamforming feedback packets to select a group of multiple communication devices from among the plurality of second communication devices, wherein the group is selected for simultaneous transmissions to the first communication device. The first device then transmits a synchronization signal to the group to prompt second communication devices in the group to simultaneously transmit to the first communication device at a particular time. The first device then receives simultaneous transmissions from the group responsive to the synchronization signal.

25 Claims, 10 Drawing Sheets

(52) U.S. Cl.
CPC ............ *H04B 7/0452* (2013.01); *H04B 7/0456* (2013.01); *H04B 7/0619* (2013.01); *H04B 7/0634* (2013.01); *H04W 56/005* (2013.01); *H04W 56/0015* (2013.01)

(56) References Cited

U.S. PATENT DOCUMENTS

| | | | |
|---|---|---|---|
| 6,377,813 B1 | 4/2002 | Kansakoski et al. | |
| 6,519,229 B1 | 2/2003 | Arai et al. | |
| 6,947,388 B1 | 9/2005 | Wagner | |
| 7,599,332 B2 | 10/2009 | Zelst et al. | |
| 7,742,390 B2 | 6/2010 | Mujtaba | |
| 7,804,800 B2 | 9/2010 | Li et al. | |
| 7,917,107 B2 | 3/2011 | Gu et al. | |
| 8,144,647 B2 | 3/2012 | Nabar et al. | |
| 8,149,811 B2 | 4/2012 | Nabar et al. | |
| 8,155,138 B2 | 4/2012 | van Nee | |
| 8,194,604 B2 | 6/2012 | Gault et al. | |
| 8,270,909 B2 | 9/2012 | Zhang et al. | |
| 8,289,869 B2 | 10/2012 | Sawai | |
| 8,363,578 B1 | 1/2013 | Ramamurthy et al. | |
| 8,472,383 B1 | 6/2013 | Banerjea et al. | |
| 8,526,351 B2 | 9/2013 | Fischer et al. | |
| 8,571,010 B1 | 10/2013 | Zhang et al. | |
| 8,599,803 B1 | 12/2013 | Zhang et al. | |
| 8,619,907 B2 | 12/2013 | Mujtaba et al. | |
| 8,644,368 B1 | 2/2014 | Zhang et al. | |
| 8,660,497 B1 | 2/2014 | Zhang et al. | |
| 8,670,399 B2 | 3/2014 | Liu et al. | |
| 8,675,575 B2 | 3/2014 | Gong et al. | |
| 8,724,546 B2 | 5/2014 | Zhang et al. | |
| 8,724,720 B2 | 5/2014 | Srinivasa et al. | |
| 8,737,405 B2 | 5/2014 | Liu et al. | |
| 8,787,338 B2 | 7/2014 | Liu et al. | |
| 8,787,385 B2 | 7/2014 | Liu et al. | |
| 8,811,203 B1 | 8/2014 | Liu et al. | |
| 8,855,053 B2 | 10/2014 | Chen et al. | |
| 8,886,755 B1 | 11/2014 | Liu et al. | |
| 8,891,640 B2 | 11/2014 | Nabar et al. | |
| 8,923,118 B1 | 12/2014 | Liu et al. | |
| 8,971,350 B1 | 3/2015 | Liu | |
| 8,976,877 B2 * | 3/2015 | Stacey | H04W 74/06 375/260 |
| 9,166,660 B2 | 10/2015 | Chu et al. | |
| 2002/0061768 A1 | 5/2002 | Liang et al. | |
| 2002/0098860 A1 | 7/2002 | Pecen et al. | |
| 2002/0145985 A1 | 10/2002 | Love et al. | |
| 2003/0064728 A1 | 4/2003 | Speight | |
| 2003/0128684 A1 | 7/2003 | Hirsch et al. | |
| 2004/0001429 A1 | 1/2004 | Ma et al. | |
| 2004/0057530 A1 | 3/2004 | Tarokh et al. | |
| 2004/0066766 A1 | 4/2004 | Shiu et al. | |
| 2005/0044473 A1 | 2/2005 | Huang et al. | |
| 2005/0058151 A1 | 3/2005 | Yeh | |
| 2005/0135284 A1 | 6/2005 | Nanda et al. | |
| 2005/0135318 A1 | 6/2005 | Walton et al. | |
| 2005/0226198 A1 | 10/2005 | Barak et al. | |
| 2006/0014554 A1 | 1/2006 | Gerlach | |
| 2006/0023669 A1 | 2/2006 | Yamaura et al. | |
| 2006/0045048 A1 | 3/2006 | Kwon et al. | |
| 2006/0120395 A1 | 6/2006 | Xing et al. | |
| 2007/0004440 A1 | 1/2007 | Breuer et al. | |
| 2007/0017754 A1 | 1/2007 | Kakinuma et al. | |
| 2007/0060149 A1 | 3/2007 | Lim et al. | |
| 2007/0086370 A1 | 4/2007 | Jang et al. | |
| 2007/0171808 A1 | 7/2007 | Wu et al. | |
| 2007/0206534 A1 | 9/2007 | Kwun et al. | |
| 2007/0223469 A1 | 9/2007 | Chandra et al. | |
| 2007/0237181 A1 | 10/2007 | Cho et al. | |
| 2008/0075058 A1 | 3/2008 | Mundarath et al. | |
| 2008/0084837 A1 | 4/2008 | Watanabe et al. | |
| 2008/0084941 A1 | 4/2008 | Mohanty et al. | |
| 2008/0117867 A1 | 5/2008 | Yin et al. | |
| 2008/0119194 A1 | 5/2008 | Kim et al. | |
| 2008/0130483 A1 | 6/2008 | Khandekar et al. | |
| 2008/0192644 A1 | 8/2008 | Utsunomiya et al. | |
| 2008/0292015 A1 | 11/2008 | Lee | |
| 2008/0310363 A1 | 12/2008 | McBeath et al. | |
| 2008/0316961 A1 | 12/2008 | Bertrand et al. | |
| 2008/0318612 A1 | 12/2008 | Axnas et al. | |
| 2009/0022093 A1 | 1/2009 | Nabar et al. | |
| 2009/0022128 A1 | 1/2009 | Nabar et al. | |
| 2009/0066577 A1 * | 3/2009 | Kim | H04L 25/03343 342/373 |
| 2009/0129304 A1 | 5/2009 | Kim et al. | |
| 2009/0196163 A1 | 8/2009 | Du | |
| 2009/0225710 A1 | 9/2009 | Gupta et al. | |
| 2009/0232234 A1 | 9/2009 | Du | |
| 2009/0262696 A1 | 10/2009 | Wei et al. | |
| 2009/0316585 A1 | 12/2009 | Srinivasan et al. | |
| 2010/0029325 A1 | 2/2010 | Wang et al. | |
| 2010/0046358 A1 | 2/2010 | van Nee | |
| 2010/0046656 A1 | 2/2010 | van Nee et al. | |
| 2010/0061333 A1 | 3/2010 | Marsh et al. | |
| 2010/0061334 A1 | 3/2010 | Gault et al. | |
| 2010/0067589 A1 | 3/2010 | Schumacher et al. | |
| 2010/0118829 A1 | 5/2010 | Lin et al. | |
| 2010/0165959 A1 | 7/2010 | Park et al. | |
| 2010/0220601 A1 | 9/2010 | Vermani et al. | |
| 2010/0246498 A1 | 9/2010 | Lim et al. | |
| 2010/0250159 A1 | 9/2010 | Hall | |
| 2010/0309834 A1 | 12/2010 | Fischer et al. | |
| 2010/0309868 A1 | 12/2010 | Yang et al. | |
| 2011/0002219 A1 | 1/2011 | Kim et al. | |
| 2011/0038332 A1 | 2/2011 | Liu et al. | |
| 2011/0053527 A1 | 3/2011 | Hunzinger | |
| 2011/0096796 A1 | 4/2011 | Zhang et al. | |
| 2011/0096797 A1 | 4/2011 | Zhang et al. | |
| 2011/0116485 A1 | 5/2011 | Olszewski et al. | |
| 2011/0128929 A1 | 6/2011 | Liu et al. | |
| 2011/0128947 A1 | 6/2011 | Liu et al. | |
| 2011/0194644 A1 | 8/2011 | Liu et al. | |
| 2011/0235596 A1 | 9/2011 | Wentink | |
| 2011/0310827 A1 | 12/2011 | Srinivasa et al. | |
| 2012/0033753 A1 | 2/2012 | Hamaguchi | |
| 2012/0039196 A1 | 2/2012 | Zhang | |
| 2012/0044906 A1 | 2/2012 | Chen et al. | |
| 2012/0082040 A1 | 4/2012 | Gong et al. | |
| 2012/0275409 A1 | 11/2012 | Han et al. | |
| 2013/0259017 A1 | 10/2013 | Zhang et al. | |
| 2013/0286959 A1 | 10/2013 | Lou et al. | |
| 2013/0301551 A1 | 11/2013 | Ghosh et al. | |
| 2015/0049727 A1 | 2/2015 | Wentink et al. | |
| 2015/0063255 A1 | 3/2015 | Tandra et al. | |
| 2015/0117227 A1 | 4/2015 | Zhang et al. | |
| 2015/0146653 A1 | 5/2015 | Zhang et al. | |
| 2015/0146654 A1 | 5/2015 | Chu et al. | |
| 2015/0146807 A1 | 5/2015 | Zhang et al. | |
| 2015/0146808 A1 | 5/2015 | Chu et al. | |
| 2015/0146812 A1 | 5/2015 | Chu et al. | |

FOREIGN PATENT DOCUMENTS

| | | |
|---|---|---|
| JP | 10136446 | 5/1998 |
| JP | 11069426 | 3/1999 |
| WO | WO-2008/025040 | 2/2008 |
| WO | WO-2011/035204 | 3/2011 |
| WO | WO-2011/130344 | 10/2011 |
| WO | WO-2012/051319 | 4/2012 |
| WO | WO-2012/111939 | 8/2012 |
| WO | WO-2012/173326 | 12/2012 |

OTHER PUBLICATIONS

3GPP TS 36.213, V8.5.0, "3rd Generation Partnership Project; Technical Specification Group Radio Access Network; Evolved Universal Terrestrial Radio Access (E-UTRA); Physical layer procedures (Release 8)," *3rd Generation Partnership Project,* 76 pages (Dec. 2008).

IEEE 802.20-PD-06; IEEE P 802.20™V14, Draft 802.20 Permanent Document; <System Requirements for IEEE 802.20 Mobile Broadband Wireless Access Systems—Version 14>, 24 pages (Jul. 16, 2004).

(56) References Cited

OTHER PUBLICATIONS

IEEE P802.11n™D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).

IEEE Std P802.11-REVma/06.0, (Revision of IEEE Std 802.11-1999) "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma_D7.0), pp. 1-1212 (2006).

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. 1-1184 (Jun. 12, 2007).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-92, (1999) Reaffirmed (Jun. 12, 2003).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-83 (Sep. 1999).

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, pp. 1-89 (Sep. 1999).

IEEE Std 802.11b-1999/Cor Jan. 2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, pp. 1-23 (Nov. 7, 2001).

IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, pp. 1-53 (May 2002).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, pp. 1-69 (Apr. 2003).

IEEE Std 802.11e/D11.0, "IEEE Standard for Information technology—Telecommunications and information exchange between systems—Local and metropolitan area networks—Specific requirements, Part 11: Wireless Medium Access Control (MAC) and Physical Layer (PHY) Specifications: Amendment 7: Medium Access Control (MAC) Quality of Service (QoS) Enhancements," *The Institute of Electrical and Electronics Engineers, Inc.*, pp. 1-196 (Oct. 2004).

IEEE Std. 802.11 n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).

IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements

(56) References Cited

OTHER PUBLICATIONS for Very High Throughput for Operation in Bands below 6 GHz," *The Institute of Electrical and Electronics Engineers, Inc.*, pp. 1-446 (Jul. 2013).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE Std 802.11ah™/D1.0 "Draft Standard for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," The Institute of Electrical and Electronics Engineers, Inc., pp. 1-394 (Oct. 2013).

IEEE P802.16Rev2/D5 (Jul. 2008) (Revision of IEEE Std 802.16/2004 and consolidates material from IEEE Std 802.16e-2005, Std 802.16/2004/Cor1-2005, Std 802.16f-2005 and Std 802.16g-2007) "Draft Standard for Local and metropolitan area networks: Part 16: Air Interface for Broadband Wireless Access Systems," *The Institute of Electrical and Electronics Engineers, Inc.*, pp. 1-1970 (Jun. 2008).

IEEE Std 802.16-2004 (Revision of IEEE Std 802.16-2001), "IEEE Standard for Local and metropolitan area networks; Part 16: Air Interface for Fixed Broadband Wireless Access Systems," *The Institute of Electrical and Electronics Engineers, Inc.*, 893 pages (Oct. 1, 2004).

IEEE Std 802.16-2009 (Revision of IEEE Std. 802.16-2004), IEEE Standard for Local and.metropolitan area networks: Part 16: Air Interface for Broadband Wireless Access Systems, *The Institute of Electrical and Electronics Engineers, Inc.*, 2082 pages (May 29, 2009).

IEEE Std 802.16e-2005 and IEEE Std 802.16-2004/Cor1-2005 (Amendment and Corrigendum to IEEE Std 802.16-2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1, *The Institute of Electrical and Electronics Engineers, Inc.*, pp. 1-864 (Feb. 28, 2006).

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).

Ansari et al., "Unified MIMO Pre-Coding Based on Givens Rotation," *The Institute of Electrical and Electronics Engineers*, doc. No. IEEE C802.16e-04/516r2, pp. 1-13, (Jan. 11, 2005).

Cariou et al., "Multi-channel Transmissions," Doc. No. IEEE 802.11-09/1022r0, *The Institute of Electrical and Electronics Engineers, Inc.*, pp. 1-13 (Sep. 2009).

Chen, "Home Network Basis: Transmission Environments and Wired/Wireless Protocols," *Prentice Hall*, pp. 1-26 (Jul. 2003).

Eslami et al., "Net Thoroughput Maximization of Per-Chunk User Scheduling for MIMO-OFDM Downlink," *IEEE Transactions on Vehicular Technology*, vol. 60, No. 9, pp. 4338-4348 (Nov. 2011).

Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).

Hiertz et al., "The IEEE 802.11 Universe," *IEEE Communications Magazine*, pp. 62-70, (Jan. 2010).

Jang et al., "Frame Design and Throughput Evaluatioln for Practice Multiuser MIMO OFDMA Systems," *IEEE Transactions on Vehicular Technology*, vol. 60, No. 7, pp. 3127-3141 (Sep. 2011).

Lestable et al., "Uplink MIMO Schemes for 802.16m," IEEE 802.16 Broadband Wireless Access Working Group, IEEE C802.16m-08/534, 18 pages (Jul. 7, 2008).

Invitation to Pay Additional Fees and Partial International Search Report for International Application No. PCT/US2014/067583, mailed Mar. 6, 2015 (8 pages).

Liu et al., "Donwlink MIMO in LTE-Advanced: SU-MIMO vs. MU-MIMO," LTE Advance and 4G Wireless Communications, *IEEE Communications Magazine*, pp. 140-147 (Feb. 2012).

Liu et al., "VHT BSS Channel Selection," *Institute of Electrical and Electronics Engineers, Inc.*, doc. No. IEEE 802.11-11/1433r0, pp. 1-10 (Nov. 2011).

Love et al., "An Overview of Limited Feedback in Wireless Communication Systems," IEEE J. on Selected Areas in Communications, vo. 26, No. 8, pp. 1341-1365 (Oct. 2008).

Mujtaba, "IEEE P802.11—Wireless LANs, TGn Sync Proposal Technical Specification," *The Institute of Electrical and Electronics Engineers, Inc.*, doc.: IEEE 802.11—04/0889r6, pp. 1-131 (May 2005).

Noh et al., "Channel Selection and Management for 11 ac," Doc. No. IEEE 802.11-10/0593r1, *The Institute of Electrical and Electronics Engineers, Inc.*, pp. 1-21 (May 20, 2010).

Park, "IEEE 802.11ac: Dynamic Bandwidth Channel Access," 2011 IEEE Int'l Conf. on Communications (ICC), pp. 1-5 (Jun. 2011).

Pedersen et al., "Carrier Aggregation for LTE-Advanced: Functionality and Performance Aspects," IEEE Communications Magazine, vol. 49, No. 6, pp. 89-95, (Jun. 1, 2011).

Perahia et al., "Gigabit Wireless LANs: an overview of IEEE 802.11ac and 80211ad," ACM SIGMOBILE Mobile Computing and Communications Review, vo. 15, No. 3, pp. 23-33 (Jul. 2011).

Redieteab et al., "Cross-Layer Multichannel Aggregation for Future WLAN Systems," 2010 IEEE Int'l Conf. on Communication Systems (ICCS), pp. 740-756 (Nov. 2010).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

Syafei et al., "A Design of Next Generation Gigabit MIMO Wireless LAN System ," IEEE 12th Int'l Conference on Advanced Communication Technology (ICACT 2010), *The Institute of Electrical and Electronics Engineers*, pp. 941-946 (2010).

Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).

Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), *The Institute of Electrical and Electronics Engineers*, pp. 207-211 (2009).

Tandai et al., "An efficient uplink multiuser MIMO protocol in IEEE 802.11 WLANs," IEEE 20th International Symposium on Personal, Indoor and Mobile Radio Communications (PIMRC 2009), pp. 1153-1157 (Sep. 13, 2009).

van Nee et al. "The 802.11 n MIMO-OFDM Standard for Wireless LAN and Beyond," Wireless Personal Communications, vol. 37, pp. 445-453 (Jun. 2006).

Wannstrom, "Carrier Aggregation explained," pp. 1-6 (May 2012).

Yuan et al., "Carrier Aggregation for LTE-Advanced Mobile Communication Systems," IEEE Communications Magazine, pp. 88-93 (Feb. 2010).

International Search Report and Written Opinion in International Application No. PCT/US2014/067596, mailed Feb. 20, 2015 (12 pages).

Zhang et al., "Applying Antenna Selection in WLANs for Achieving Broadband Multimedia Communications," *IEEE Trans. on Broadcasting*, vol. 52, No. 4, pp. 475-482 (Dec. 2006).

(56) References Cited

OTHER PUBLICATIONS

U.S. Appl. No. 12/730,651, Zhang et al, "OFDMA with Block Tone Assignment for WLAN," filed Mar. 24, 2010.
U.S. Appl. No. 61/227,356, Zhang et al., "Uplink Multiuser MIMO in WLAN," filed Jul. 21, 2009.

Bejerano, "IEEE 802.11ac: from channelization to multi-user MIMO," IEEE Communications Magazine, IEEE Service Center, vol. 51 No. 10, pp. 84-90 (Oct. 1, 2013).
Kumaradan, "Uplink Scheduling in CDMA Packet-Data Systems," Journal Wireless Networks, vol. 12, Issue 1, pp. 33-43 (Feb. 2006).

* cited by examiner

UPLINK MULTI-USER MULTIPLE INPUT MULTIPLE OUTPUT BEAMFORMING

CROSS-REFERENCES TO RELATED APPLICATIONS

This application is a divisional of U.S. patent application Ser. No. 14/554,497, entitled "Uplink Multi-User Multiple Input Multiple Output Beamforming," filed Nov. 26, 2014, which claims the benefit of the U.S. Provisional Patent Application No. 61/909,598, entitled "UL MU MIMO Beamforming," filed Nov. 27, 2013. The entire disclosures of both of the applications referenced above are hereby incorporated by reference herein.

FIELD OF THE DISCLOSURE

The present disclosure relates generally to communication networks and, more particularly, to beamforming training for multiple input, multiple output (MIMO) communication networks.

BACKGROUND

Wireless local area network (WLAN) technology has evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps); the IEEE 802.11a and 802.11g Standards specify a single-user peak throughput of 54 Mbps; the IEEE 802.11n Standard specifies a single-user peak throughput of 600 Mbps; and the IEEE 802.11ac Standard specifies a single-user peak throughput of 6.77 gigabits per second (Gbps). Work has begun on a new standard, IEEE 802.11ax, that promises to provide even greater throughput.

SUMMARY

Embodiments of various systems and methods are disclosed for beamforming training and selection of devices for simultaneous, multi-device transmissions in a communication network that utilizes multiple input, multiple output wireless communication techniques.

In an embodiment, a method includes: prompting, at a first communication device, a plurality of second communication devices to transmit, to the first communication device, respective beamforming training packets as part of a procedure for developing respective transmit beamforming matrices for use by the plurality of second communication devices; receiving, at the first communication device, the respective beamforming training packets as part of the procedure for developing the respective transmit beamforming matrices, the respective beamforming training packets having been transmitted by the plurality of second communication devices in response to the prompting; generating, at the first communication device, respective beamforming feedback packets based on reception of the respective beamforming training packets; transmitting, from the first communication device, the respective beamforming feedback packets as part of the procedure for developing the respective transmit beamforming matrices; selecting, at the first communication device, a group of multiple second communication devices from among the plurality of second communication devices using channel information developed based on reception of the respective beamforming training packets, the group selected for simultaneous transmissions to the first communication device; transmitting, with the first communication device, a synchronization signal to the group to prompt second communication devices in the group to simultaneously transmit to the first communication device at a particular time; and receiving, with the first communication device, simultaneous transmissions from the group responsive to the synchronization signal, the simultaneous transmissions having been beamformed by second communication devices in the group using transmit beamforming matrices developed by the second communication devices in the group as part of the procedure for developing respective transmit beamforming matrices for use by the plurality of second communication devices.

In another embodiment, an apparatus comprises a network interface device of a first communication device, the network interface device having one or more integrated circuit devices configured to: prompt a plurality of second communication devices to transmit, to the first communication device, respective beamforming training packets as part of a procedure for developing respective transmit beamforming matrices for use by the plurality of second communication devices; receive the respective beamforming training packets transmitted by the plurality of second communication devices as part of the procedure for developing the respective transmit beamforming matrices and in response to the prompt; generate respective beamforming feedback packets based on reception of the respective beamforming training packets; transmit the respective beamforming feedback packets as part of the procedure for developing the respective transmit beamforming matrices; select a group of multiple second communication devices from among the plurality of second communication devices using channel information developed based on reception of the respective beamforming training packets, the group selected for simultaneous transmissions to the first communication device; transmit a synchronization signal to the group to prompt second communication devices in the group to simultaneously transmit to the first communication device at a particular time; and receive simultaneous transmissions from the group responsive to the synchronization signal, the simultaneous transmissions having been beamformed by second communication devices in the group using transmit beamforming matrices developed by the second communication devices in the group as part of the procedure for developing respective transmit beamforming matrices for use by the plurality of second communication devices.

In yet another embodiment, an apparatus comprises a network interface device of a first communication device, the network interface device having one or more integrated circuit devices configured to: receive a prompt from a second communication device, the prompt for the first communication device to transmit a beamforming training packet to the second communication device as part of a beamforming training procedure for developing a transmit beamforming matrix for use by the first communication device when transmitting to the second communication device simultaneously with one or more third communication devices transmitting to the second communication device; in response to the prompt, transmit the beamforming training packet to the second communication device as part of the beamforming training procedure; receive, from the second communication device, a beamforming feedback packet as part of the beamforming training procedure; generate a transmit beamforming matrix for use by the first communication device when transmitting to the second communication device simultaneously with the one or more third communication devices transmitting to the second communication device; receive a synchronization signal transmitted, by the second communication device, to a group of communication devices to prompt communication devices in the group to simultaneously transmit to the second communication device at a particular time, wherein the group comprises the first communication device and the one or more third communication devices; and transmit a data packet to the second communication device simultaneous with transmissions by the one or more third communication devices to the second communication device, wherein transmission of the data packet includes utilizing the transmit beamforming matrix, and transmission of the data packet and the transmissions by the one or more third communication devices are responsive to the synchronization signal.

In still another embodiment, an apparatus comprises a network interface device of a first communication device, the network interface device having one or more integrated circuit devices configured to: transmit a beamforming training packet as part of a beamforming training procedure for developing a transmit beamforming matrix for use by the first communication device; receive a plurality of respective beamforming feedback packets from a plurality of second communication devices, the plurality of beamforming feedback packets being part of the beamforming training procedure for developing the transmit beamforming matrix for use by the first communication device; use the plurality of beamforming feedback packets to select a group of multiple communication devices from among the plurality of second communication devices, the group selected for simultaneous transmissions to the first communication device; transmit a synchronization signal to the group to prompt second communication devices in the group to simultaneously transmit to the first communication device at a particular time; and receive simultaneous transmissions from the group responsive to the synchronization signal.

In another embodiment, an apparatus comprises a network interface device of a first communication device, the network interface device having one or more integrated circuit devices configured to: receive a beamforming training packet transmitted by a second communication device as part of a beamforming training procedure for developing a first transmit beamforming matrix for use by the second communication device; generate a beamforming feedback packet based on reception of the beamforming training packet; transmit the beamforming feedback packet as part of the beamforming training procedure for developing the first transmit beamforming matrix for use by the second communication device; generate a second beamforming matrix for use by the first communication device when transmitting to the second communication device simultaneously with one or more third communication devices transmitting to the second communication device; receive a synchronization signal transmitted, by the second communication device, to a group of communication devices to prompt communication devices in the group to simultaneously transmit to the second communication device at a particular time, wherein the group comprises the first communication device and the one or more third communication devices; and transmit a data packet to the second communication device simultaneous with transmissions by the one or more third communication devices to the second communication device, wherein transmission of the data packet is responsive to the synchronization signal, and the network interface device utilizes the second beamforming matrix when transmitting the data packet.

DETAILED DESCRIPTION

Figure 1:
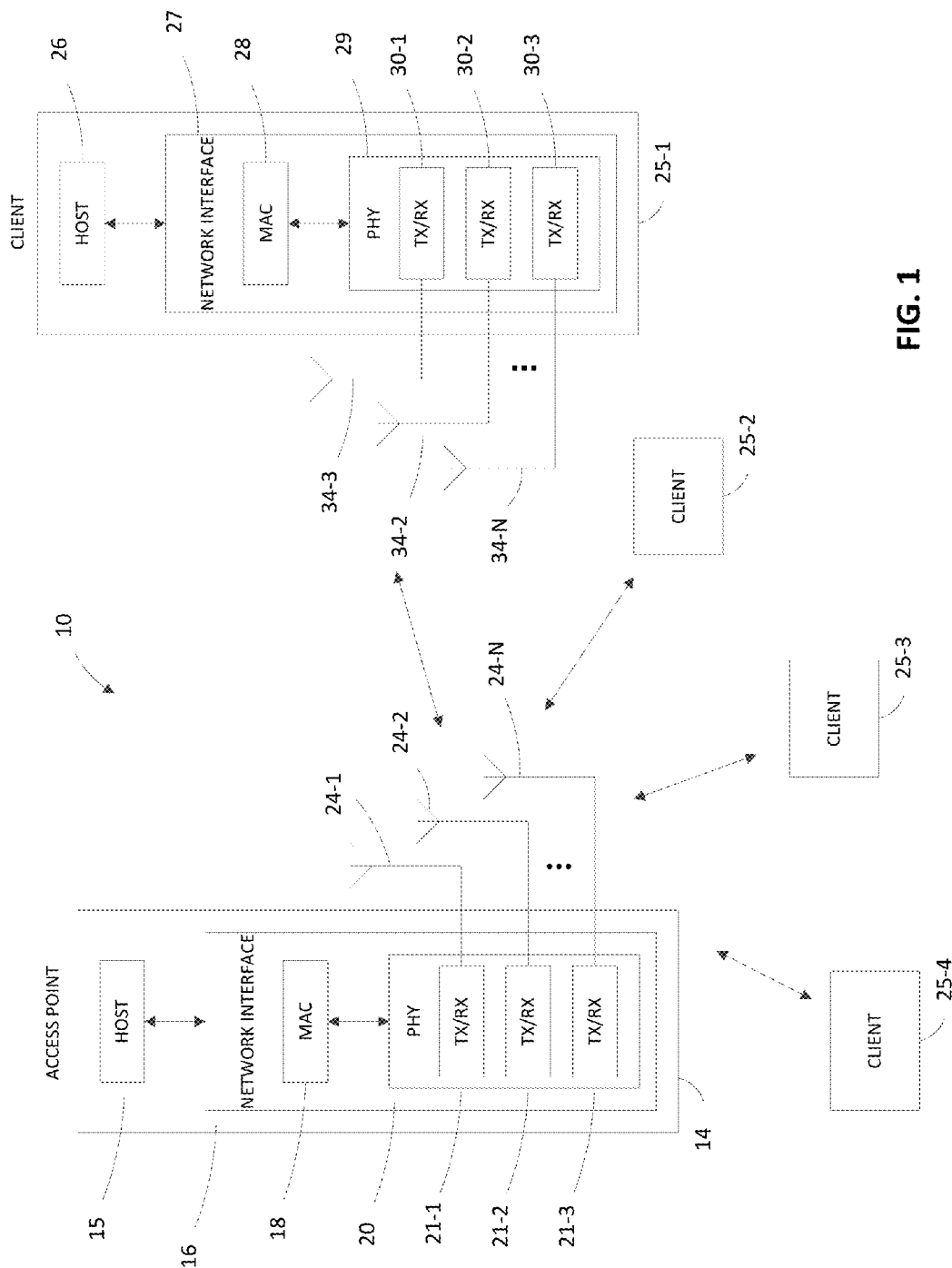
FIG. 1 is a block diagram of an example wireless local area network (WLAN) communication system in which an access point (AP) uses beamforming training techniques such as described herein, according to an embodiment.

In some embodiments described below, a first communication device, such as an access point (AP) of a wireless local area network (WLAN), transmits a beamforming training signals to a plurality of second communication devices, such as client stations, the beamforming training signals for developing a transmit beamforming matrix for use by the first communication device. The plurality of second communication devices respectively develop beamforming training feedback information and transmit the beamforming training feedback information to the first communication device. Additionally, the plurality of second communication devices develop respective transmit beamforming matrices for use when transmitting to the first communication device. The first communication device uses the beamforming training feedback information to select a group of multiple second communication devices from the plurality of second communication devices for subsequent simultaneously transmissions from the group to the first communication device. The first communication device then prompts the group of multiple second communication devices to simultaneously transmit to the first communication device. In response, the communication devices in the group of multiple second communication devices simultaneously transmit to the first communication device using the transmit beamforming matrices developed by the communication devices in the group of multiple second communication devices. In an embodiment, the simultaneous transmission is a MU MIMO transmission. In an embodiment, the simultaneous transmission is an OFDMA transmission.

In some embodiments described below, a first communication device, such as an access point (AP) of a wireless local area network (WLAN), prompts a plurality of second communication devices, such as client stations, to transmit respective beamforming training signals to the first communication device for developing respective transmit beamforming matrices for use by the plurality of second communication devices. The first communication device develops respective beamforming training feedback information based on the received beamforming training signals, and transmits the beamforming training feedback information to the plurality of second communication devices. The first communication device also uses the received beamforming training signals to select a group of multiple second communication devices from the plurality of second communication devices for subsequent simultaneously transmissions from the group to the first communication device. The first communication device then prompts the group of multiple second communication devices to simultaneously transmit to the first communication device. In response, the communication devices in the group of multiple second communication devices simultaneously transmit to the first communication device using respective transmit beamforming matrices developed based on the beamforming training signals that were transmitted to the first communication device.

FIG. 1 is a block diagram of an example WLAN 10 in which communication devices such as an AP 14 and client devices 25 exchange information using OFDM (Orthogonal Frequency-Division Multiplexing) techniques in a multiple input, multiple output (MIMO) mode, according to an embodiment. The AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to N antennas 24, where N is a suitable positive integer.

In FIG. 1, the AP 14 has the same number of transceivers 21 as antennas 24, but in other embodiments, the AP 14 includes a different number of transceivers 21 than antennas 24 (e.g., there are more antennas than transceivers and antenna switching techniques are utilized). In FIG. 1, three transceivers 21 and three antennas 24 are illustrated, but in other embodiments, the AP 14 includes different suitable numbers of transceivers 21 and antennas 24. (e.g., 1, 2, 4, 5, 6, 8, etc.). In one embodiment, the MAC processing unit 18 and the PHY processing unit 20 are configured to operate according to a communication protocol generally similar to the IEEE 802.11n Standard and/or the IEEE 802.11ac Standard (e.g., a communication protocol that supports transmit beamforming using multiple antennas (sometimes referred to herein as supporting "a beamforming protocol")), for example.

The network interface device 16 (e.g., the MAC processing unit 18 and/or the PHY processing unit 20) is configured to perform beamforming training procedures with client devices 25, in some embodiments. For example, the network interface device 16 is configured to transmit beamforming training signals to the client devices 25 and, in response, receive beamforming feedback from the client devices 25, in some embodiments. For example, the beamforming feedback includes a forward channel estimate, and the network interface device 16 (e.g., the PHY processing unit 20) is configured to determine a transmit beamforming matrix based on the forward channel estimate, in an embodiment.

As another example, the beamforming feedback includes an indication of a transmit beamforming matrix (e.g., the transmit beamforming matrix, a compressed form of the transmit beamforming matrix, an index to be used for looking up the transmit beamforming matrix in a table, etc.), and the network interface device 16 (e.g., the PHY processing unit 20) is configured to determine the transmit beamforming matrix based on the indication, in an embodiment.

In some embodiments, the network interface device 16 (e.g., the MAC processing unit 18 and/or the PHY processing unit 20) is configured to perform implicit beamforming training procedures with a client device 25 in order to determine a transmit beamforming matrix. For example, in some embodiments, the network interface device 16 (e.g., the PHY processing unit 20) is configured to receiving beamforming training signals from a client device 25 and to determine an estimate of a reverse channel based on the received beamforming training signals. The network interface device 16 (e.g., the PHY processing unit 20) is configured to determine, based on the determined estimate of the reverse channel, a transmit beamforming matrix for use in transmitting to the client device 25.

A client device 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although the same number of transceivers 30 and antennas 34 are illustrated in FIG. 1, the client device 25-1 includes different numbers of transceivers 30 and antennas 34, in other embodiments (e.g., there are more antennas than transceivers and antenna switching techniques are utilized). Although three transceivers 30 and three antennas 34 are illustrated in FIG. 1, the client device 25-1 includes different suitable numbers (e.g., 1, 2, 4, 5, etc.) of transceivers 30 and antennas 34 in other embodiments. The transceiver(s) 30 is/are configured to transmit generated data streams via the antenna(s) 34. Similarly, the transceiver(s) 30 is/are configured to receive data streams via the antenna(s) 34.

The network interface device 27 (e.g., the MAC processing unit 28 and/or the PHY processing unit 29) is configured to perform beamforming training procedures with the AP 14, in some embodiments. For example, the network interface device 27 is configured to receive beamforming training signals from the AP 14 and, in response, generate beamforming feedback and transmit the beamforming feedback to the AP 14, in some embodiments. For example, the network interface device 27 (e.g., the PHY processing unit 29) is configured to determine forward channel estimate based on the received training signals, in an embodiment. The network interface device 27 (e.g., the PHY processing unit 29) is configured to transmit an indication of the forward channel estimate (e.g., the forward channel estimate or a compressed form of the forward channel estimate) to the AP 14, in an embodiment.

In some embodiments, the network interface device 27 (e.g., the PHY processing unit 29) is configured to determine, based on the forward channel estimate, a transmit beamforming matrix to be used by the AP 14. The network interface device 27 (e.g., the PHY processing unit 29) is configured to transmit beamforming feedback to the AP 14 that includes an indication of the determined transmit beamforming matrix (e.g., the transmit beamforming matrix, a compressed form of the transmit beamforming matrix, an index to be used for looking up the transmit beamforming matrix in a table, etc.), in an embodiment.

In some embodiments, the network interface device 27 (e.g., the PHY processing unit 29) is configured to transmit to the AP 14 beamforming training signals as part of a beamforming training procedure.

In an embodiment, one or both of the client devices 25-2 and 25-3 have a structure the same as or similar to the client device 25-1. In these embodiments, the client devices 25 structured like the client device 25-1 have the same or a different number of transceivers and antennas. For example, the client device 25-2 has only two transceivers and two antennas, according to an embodiment.

In an embodiment, the network interface 16, is configured to transmit independent data simultaneously to multiple client stations 25 via different spatial streams and/or via different orthogonal frequency division multiplexing (OFDM) subchannels. For example, in an embodiment, the network interface 16 is configured to utilize techniques described in IEEE Std 802.11ac "IEEE Standard for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-446 (December 2013). In some embodiments, the network interface 16 is configured to utilize techniques described in one or both of U.S. Pat. No. 8,144,647, and U.S. patent application Ser. No. 12/730,651, entitled "OFDMA with Block Tone Assignment for WLAN," filed on Mar. 24, 2010, both of which are hereby incorporated by reference.

In an embodiment, the network interface 16 is configured to receive independent data simultaneously from multiple client stations 25 via different spatial streams and/or via different orthogonal frequency division multiplexing (OFDM) subchannels. For example, in an embodiment, the network interface 16 is configured to receive independent data streams transmitted simultaneously by multiple client stations 25 via different OFDM subchannels using techniques described in one or both of U.S. Pat. No. 8,149,811, and U.S. patent application Ser. No. 12/730,651, both of which are hereby incorporated by reference.

In some embodiments, two or more of the client stations 25 are configured to receive respective data streams that are transmitted simultaneously by the AP 14. In other embodiments, two or more of the client stations 25 additionally or alternatively are configured to transmit corresponding data streams to the AP 14 such that the AP 14 receives the data streams simultaneously. For example, in one embodiment, the network interface 27 is configured to receive a data stream among a plurality of independent data streams transmitted simultaneously by the AP 14 to multiple client stations 25 via different spatial streams and/or via different OFDM subchannels. For example, in an embodiment, the network interface 27 is configured to utilize techniques described in IEEE Std 802.11ac "IEEE Standard for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-446 (December 2013). In some embodiments, the network interface 27 is configured to utilize techniques described in one or both of U.S. Pat. No. 8,144,647, and U.S. patent application Ser. No. 12/730,651, entitled "OFDMA with Block Tone Assignment for WLAN," filed on Mar. 24, 2010.

As another example, in another embodiment, the network interface 27, additionally or alternatively, is configured to transmit a data stream to the AP 14 among a plurality of independent data streams transmitted simultaneously by multiple client stations 25 via different spatial streams using techniques described in U.S. patent application Ser. No. 12/175,501. As another example, in another embodiment, the network interface 27, additionally or alternatively, is configured to transmit a data stream to the AP 14 among a plurality of independent data streams transmitted simultaneously by multiple client stations 25 via different OFDM subchannels using techniques described in U.S. patent application Ser. No. 12/730,651.

Figure 2:
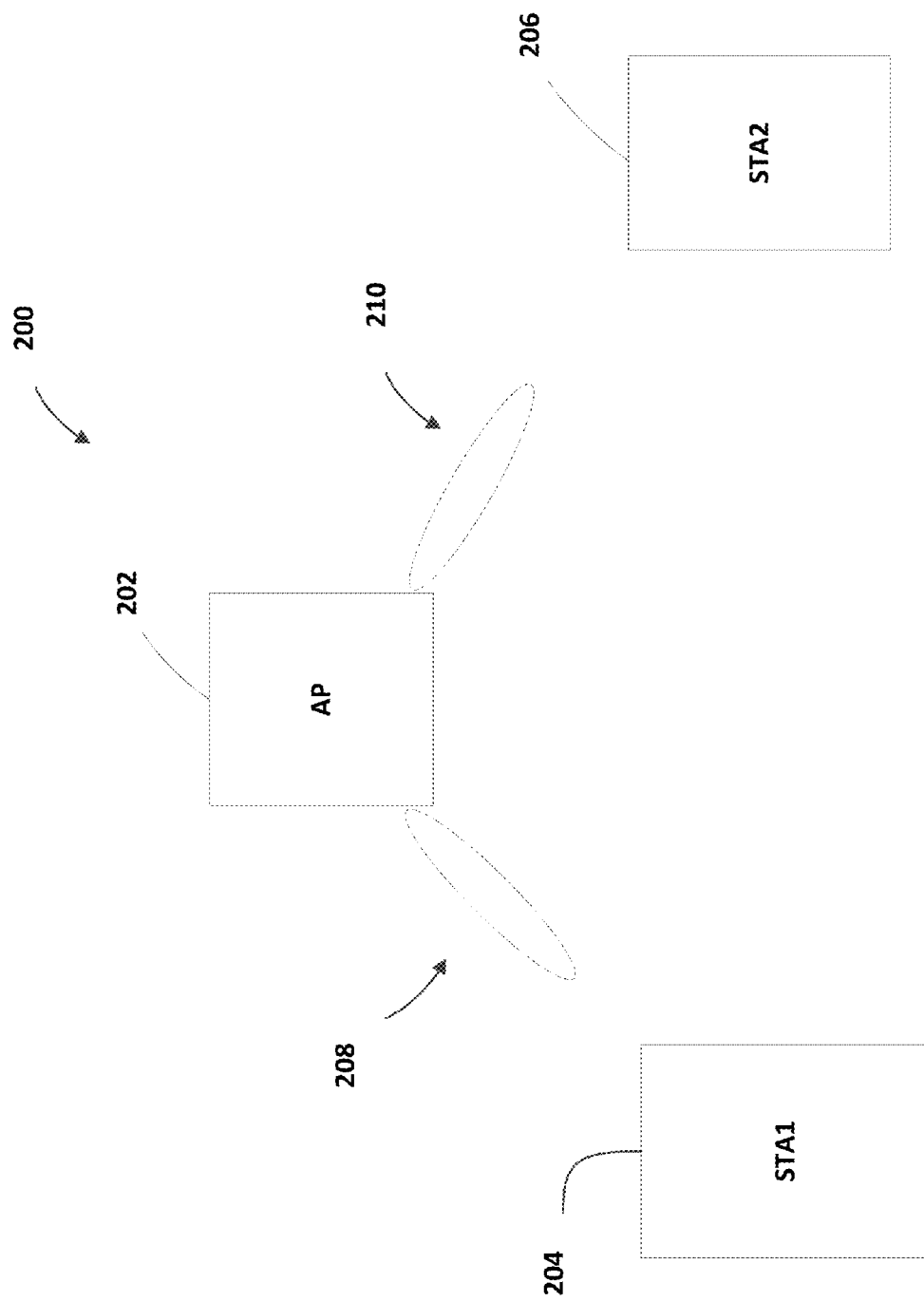
FIG. 2 is a diagram of a WLAN in which an AP uses downlink (DL) beamforming for simultaneous transmissions to a plurality of stations (STAs), according to an embodiment.

FIG. 2 is a schematic illustration of a WLAN 200 in which an AP 202 uses downlink (DL) transmit beamforming for simultaneous transmissions to a plurality of stations within the WLAN 200. In this example, the plurality of stations includes a first station 204 and a second station 206. Although two stations 204 and 206 are illustrated in FIG. 2, other suitable numbers of stations (e.g., 1, 2, 4, 5, etc.) may be employed in other embodiments.

In this example, the AP 202 utilizes DL transmit beamforming to generate a beam pattern 208 for transmissions to the first station 204. The beam pattern 208 has a radiation pattern that is generally directed toward the first station 204, in an embodiment.

Similarly, the AP 202 utilizes DL transmit beamforming to generate a beam pattern 210 for transmissions to the second station 206. The beam pattern 210 has a radiation pattern that is generally directed toward the second station 206.

Figure 3:
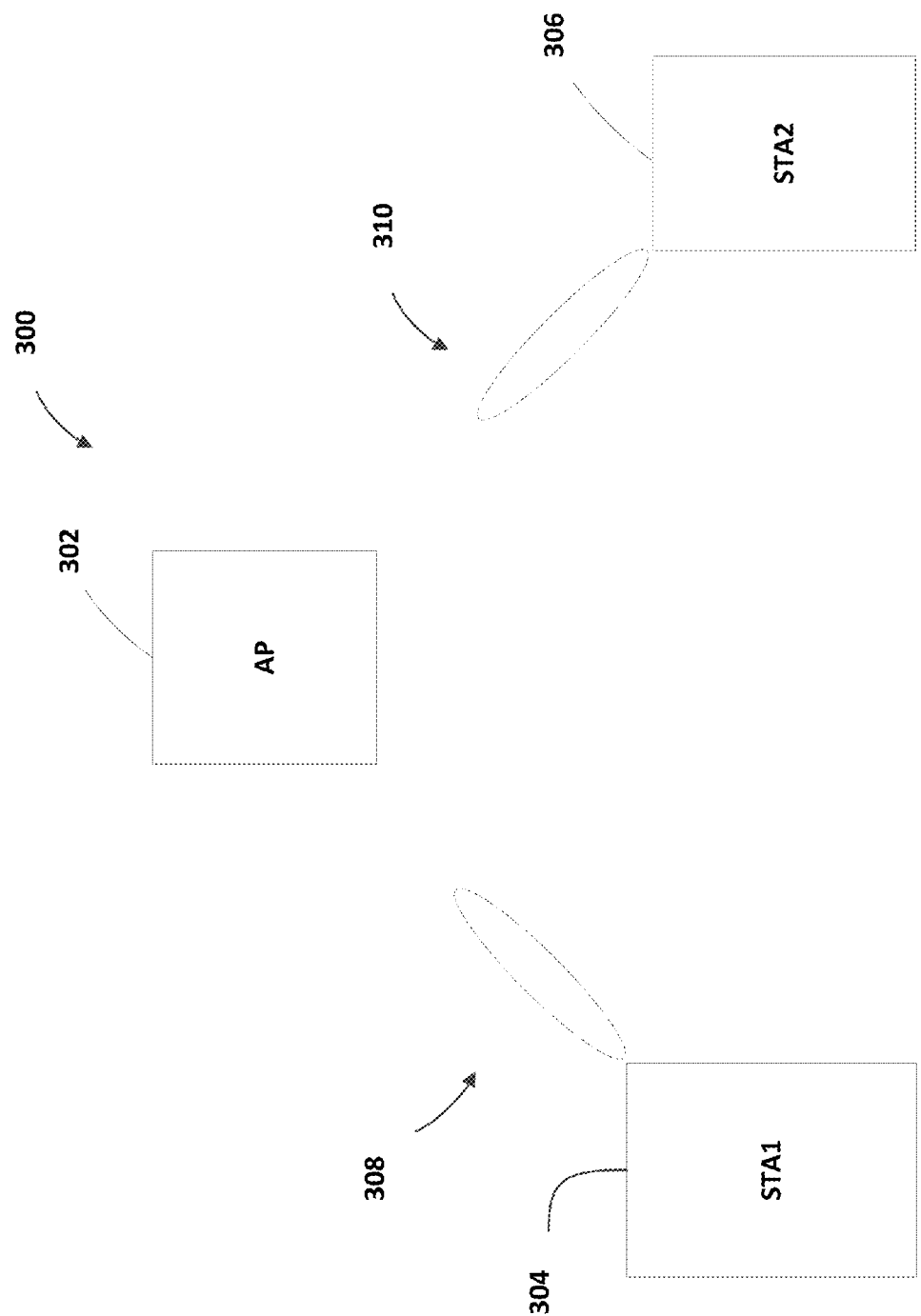
FIG. 3 is a diagram of a WLAN in which a plurality of STAs use uplink (UL) transmit beamforming for simultaneous transmissions to an AP, according to an embodiment.

FIG. 3 is a schematic illustration of a WLAN 300 in which each a plurality of stations uses uplink (UL) transmit beamforming for simultaneous transmissions to an AP 302. In this example, the plurality of stations includes a first station 304 and a second station 306. Although two stations 304 and 306 are illustrated in FIG. 3, other suitable numbers of stations (e.g., 1, 2, 4, 5, etc.) may be employed in other embodiments.

In this example, the first station 304 utilizes UL transmit beamforming to generate a beam pattern 308 for transmissions to the AP 302. The beam pattern 308 has a radiation pattern that is directed toward the AP 302.

Similarly, the second station 306 utilizes UL transmit beamforming to generate a beam pattern 310 for transmissions to the AP 302. The beam pattern 310 has a radiation pattern that is directed toward the AP 302.

Example training procedures for one or more of i) developing a transmit beamforming matrix for an AP to perform DL transmit beamforming to a plurality of stations (STAs), ii) developing respective transmit beamforming matrices for STAs in the plurality of STAs for performing UL transmit beamforming to the AP, and/or iii) selecting STAs from the plurality of STAs for simultaneous UL transmissions to the AP, according to some embodiments, are described in greater detail below. Before describing these example training procedures, however, an example WLAN is described to illustrate interactions between an AP and a group of STAs that simultaneously perform UL transmissions to the AP using UL transmit beamforming.

Figure 4:
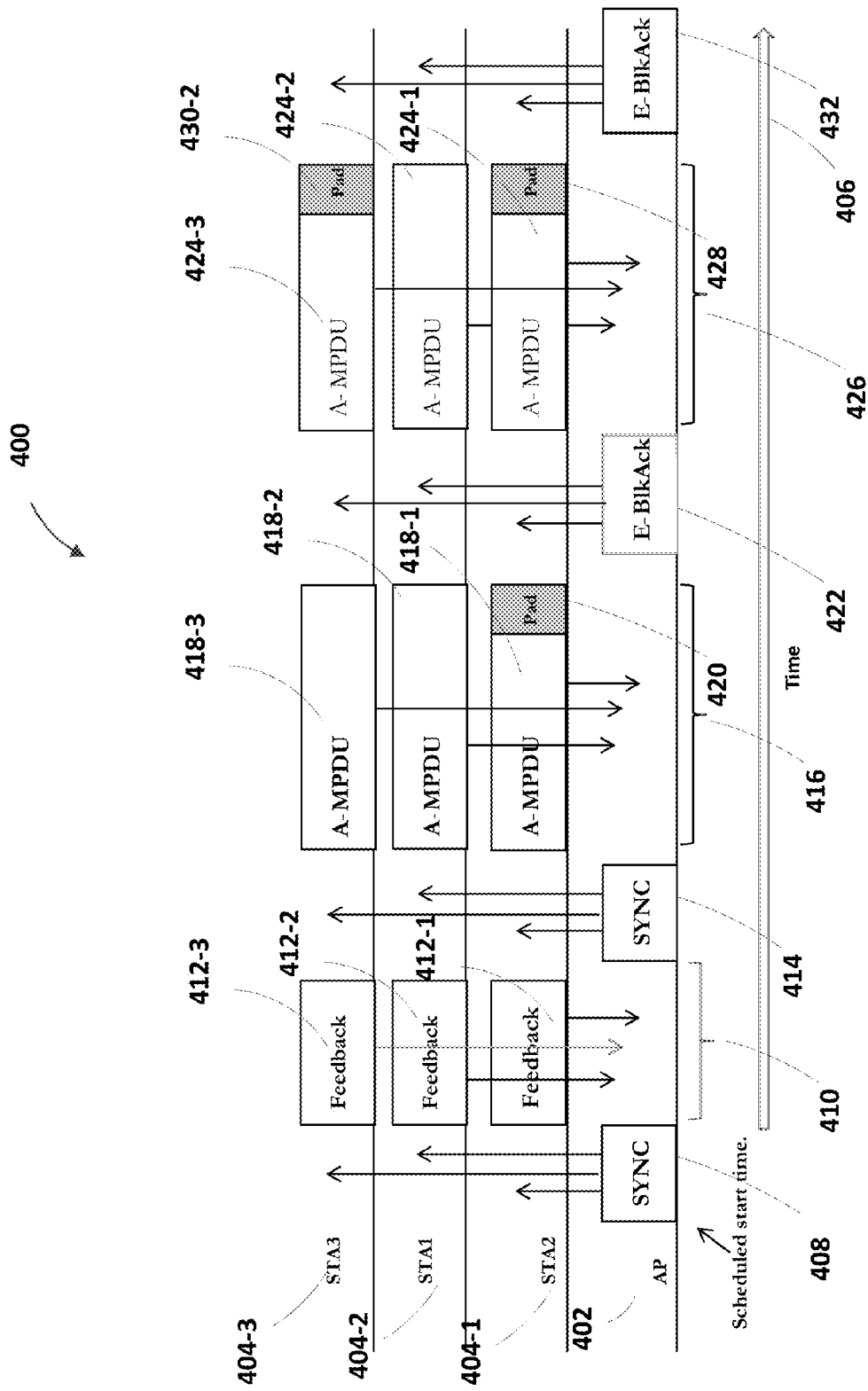
FIG. 4 is a timing diagram of interactions between an AP and a group of STAs, where the STAs transmit simultaneously to the AP, according to an embodiment.

FIG. 4 is a timing diagram 400 illustrating interactions between an AP 402 and a group of STAs 404 in an uplink group (UL group), according to an embodiment. As a result of training procedures (examples to be described below), the AP 402 determines a group of STAs 404 that comprise the UL group. In this example, the UL group comprises a first STA 404-1, a second STA 404-2, and a third STA 404-3. Although three STAs (404-1, 404-2, and 404-3) comprising an UL group are illustrated in FIG. 4, other suitable numbers of STAs (e.g., 2, 4, 5, etc.) may be employed in other embodiments and/or scenarios. In this example, the time sequence of operations occurs from left to right in FIG. 4 as illustrated by the arrow 406.

At a first time, the AP 402 transmits a synchronization (SYNC) signal 408 to STAs 404-1, 404-2, and 404-3 in the UL group. The SYNC signal indicates a transmit opportunity period (TXOP) 406, which is the length in medium time for UL transmission during which the STAs 404-1, 404-2, and 404-3 of the UL group may simultaneously transmit feedback messages to the AP 402 and the AP 402 transmits the acknowledgements. In an embodiment, the feedback messages may include the modulation and coding scheme (MCS) that each STA uses for UL transmission, the power that each STA uses for UL transmissions, and the subchannel/spatial stream that each STA uses for UL transmission. The feedback messages 412-1, 412-2, and 412-3 may provide buffer length information, requested medium time information, etc. to the AP 402 regarding data to be transmitted simultaneously from STAs 404-1, 404-2, and 404-3 to the AP 402, according to an embodiment. The AP decides, based on the feedback messages 412, the UL PPDU length, the numbers of the UL PPDUs, etc., for STAs 404-1, 404-2 and 404-3 to transmit their buffered frames to the AP, according to an embodiment.

At second time, the AP 402 transmits a SYNC message 414 to the STAs 404-1, 404-2, and 404-3 of the UL group. In an embodiment, the SYNC message 414 is transmitted by the AP 402 to the STAs 404-1, 404-2, and 404-3 of the UL group using beamforming techniques. In an embodiment, the SYNC message 414 is transmitted by the AP 402 to the STAs 404-1, 404-2, and 404-3 of the UL group omni-directionally. In an embodiment, the SYNC message 414 is transmitted by the AP 402 to the STAs 404-1, 404-2, and 404-3 of the UL group as an omni-directional legacy (e.g., IEEE 802.11a/g) PPDU. In some embodiments, the use of a legacy PPDU can provide further protection of the TXOP since legacy STAs can decode the Duration field in the legacy PPDU and set their NAV appropriately based on the value of the Duration field.

In an embodiment, the SYNC message 414 indicates the remaining TXOP until the end of 406 during which the STAs 404-1, 404-2, and 404-3 of the UL group may simultaneously transmit multiple PPDUs to the AP 402. In an embodiment, the SYNC message 414 indicates a time at which the STAs 404-1, 404-2, and 404-3 of the UL group are to begin simultaneously transmitting to the AP 402, and the SYNC message 414 indicates the PPDU length in medium time for UL transmission, the MCS that each STA uses for UL transmission, the power that each STA uses for UL transmission, and the subchannel/spatial stream that each STA uses for UL transmission. For example, the STAs 404-1, 404-2, and 404-3 of the UL group are to begin simultaneously transmitting to the AP 402 after a predetermined time period after the end of the SYNC message 414, according to an embodiment. In an embodiment, the STAs transmit the UL PPDU a short interframe space (SIFS) after the end of the reception of the SYNC frame, and the SYNC message 414 indicates the PPDU length in medium time for UL transmission, the MCS that each STA uses for UL transmission, the power that each STA uses for UL transmission, the subchannel/spatial stream that each STA uses for UL transmission.

In an embodiment, the STAs 404-1, 404-2, and 404-3 of the UL group simultaneously transmit independent data 418 to the AP 402 using UL transmit beamforming. For example, the STAs 404-1, 404-2, and 404-3 of the UL group start simultaneously transmitting to the AP 402 at a time indicated by the SYNC message 414, according to an embodiment, and the indicated time may merely be a SIFS after the end of the reception of SYNC frame, according to an embodiment. In an embodiment, the independent data 418 comprises respective aggregated MAC protocol data unit (A-MPDUs) or single MPDU (e.g. High Efficiency WLAN/Very High Throughput (HEW/VHT) single MPDU) in respective PHY protocol data units (PPDUs). In an embodiment, the independent data 418 comprises respective MPDUs in respective PPDUs.

In an embodiment, a time duration of each UL transmission for the A-MPDU is the entire duration of the PPDU 416, according to an embodiment. In other embodiments, the duration of an UL transmission for the A-MPDU may be shorter than the duration of the PPDU 416. In an embodiment, padding 420 is utilized by the STA 404-1 to extend a time duration of an UL transmission by the STA 404-1 to the entire duration of the PPDU 416.

In response to receiving the simultaneous transmissions from STAs 404-1, 404-2, and 404-3, the AP 402 transmits an E-BlkAck 422 to the STAs 404-1, 404-2, and 404-3 of the UL group to acknowledge the reception of the UL A-MPDUs and/or VHT/HEW single MPDU, according to an embodiment. In an embodiment, an E-BlkAck includes a BlkAck to acknowledge the received A-MPDU and/or an Ack to acknowledge the received HEW/VHT single MPDU. According to an embodiment, AP 402 sends the OFDMA E-BlkAck 422 simultaneously to the STAs 404-1, 404-2, and 404-3 of the UL group using DL transmit beamforming where the E-BlkAck includes respective BlkAcks to different STAs using different frequency subchannels. According to another embodiment, AP 402 broadcasts the E-BlkAck to the STAs 404-1, 404-2, and 404-3 of the UL group using a legacy (duplicate mode) PPDU.

In an embodiment, the STAs 404-1, 404-2, and 404-3 of the UL group simultaneously transmit further data (indicated as A-MPDUs 424-1, 424-2, and 424-3, respectively in FIG. 4) during a further PPDU 426. In an embodiment, the PPDU 426 is indicated by the SYNC 414 that defines multiple UL PPDU transmission. In a further embodiment, the SYNC message 414 is transmitted by the AP 402 to the STA 404-1, 404-2, and 404-3 of the UL group using omni-directional legacy 11a/g PPDU. The SYNC message 414 may indicate the PPDU length in medium time for UL transmission, the MCS that each STA uses for UL transmission, the power that each STA uses for UL transmission, the subchannel/spatial stream that each STA uses for UL transmissions. In an embodiment, the BlkAck 422 indicates a time at which the STAs 404-1, 404-2, and 404-3 of the UL group are to begin simultaneously transmitting to the AP 402. For example, the STAs 404-1, 404-2, and 404-3 of the UL group are to begin simultaneously transmitting to the AP 402 after a predetermined time period after the end of the BlkAck 422, according to an embodiment. In the example of FIG. 4, transmission 424-2 lasts the entire duration of TXOP 426 while transmissions 424-1 and 424-3 include padding 428 and 430, respectively, so that the transmissions of STAs 404-1 and 404-3 last for the duration of TXOP 426. In an embodiment, the STAs transmit the UL PPDU a SIFS after the end of the reception of the SYNC frame, and the SYNC message 414 indicates the PPDU length in medium time for UL transmission, the MCS that each STA uses for UL transmission, the power that each STA uses for UL transmission, the subchannel/spatial stream that each STA uses for UL transmission.

Further, according to an embodiment, the AP 402 sends an E-BlkAck 432 to the STAs 404-1, 404-2, and 404-3 of the UL group to acknowledge the reception of the UL A-MPDUs and/or VHT/HEW single MPDU. According to an embodiment, AP 402 sends the BlkAck 432 simultaneously to the STAs 404-1, 404-2, and 404-3 of the UL group using DL transmit beamforming where respective BlkAcks to different STAs are included in different frequency subchannels. According to an embodiment, AP 402 sends broadcast E-BlkAck to the STAs 404-1, 404-2, and 404-3 of the UL group using legacy (duplicate mode) PPDU.

Figure 5:
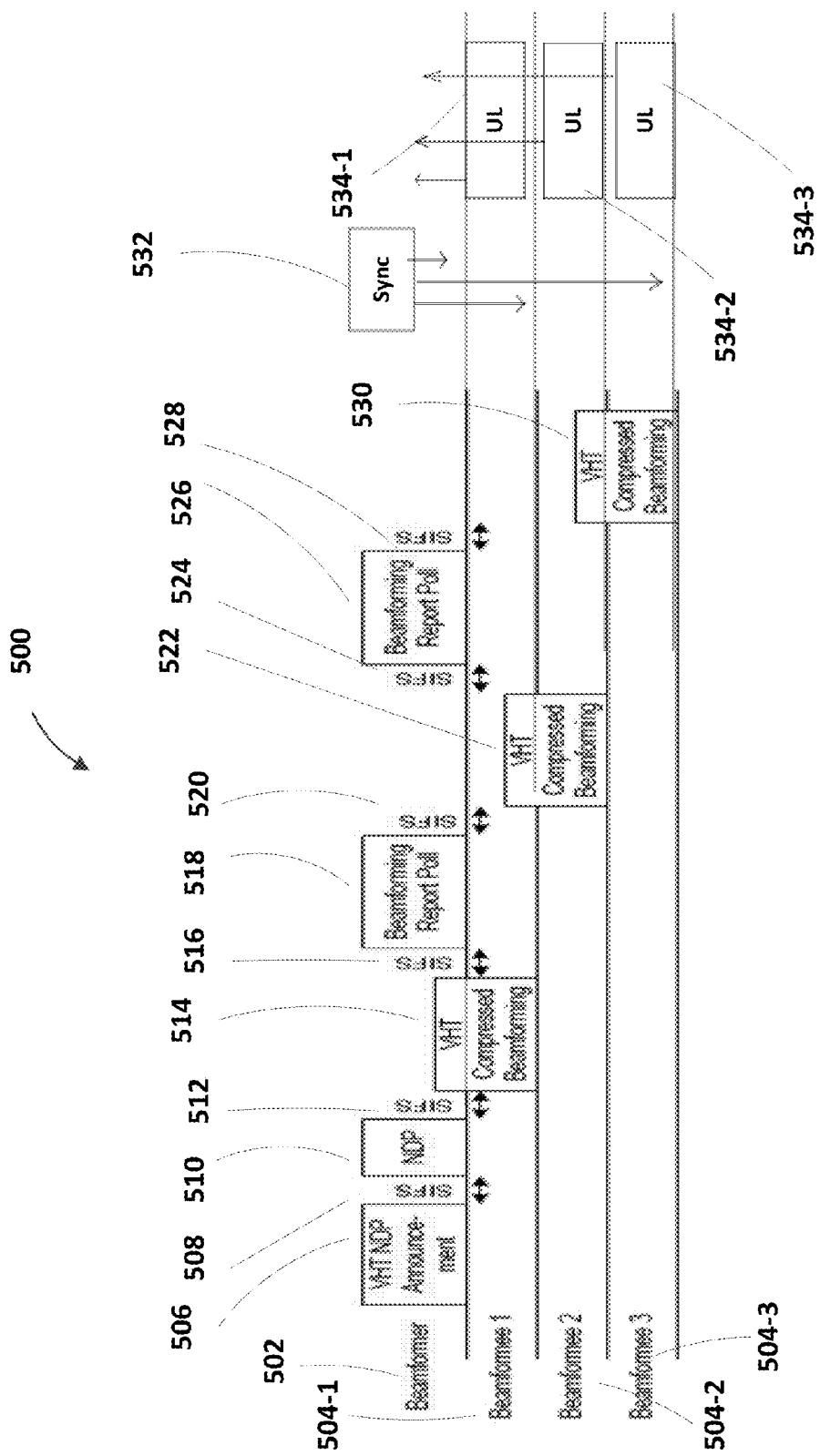
FIG. 5 is a timing diagram of interactions between an AP and a group of STAs as part of training procedure for determining UL transmit beamforming matrices for STAs and for selecting a group of STAs for simultaneous UL transmissions to the AP, according to an embodiment.

FIG. 5 is a timing diagram 500 of interactions between an AP and a group of STAs as part of a training procedure for i) developing a transmit beamforming matrix for use by a first communication device 502, and ii) selecting a group of second communication devices 504 for simultaneous transmission to the first communication device, according to an embodiment. Merely for illustrative purposes, the first communication device 502 is referred to below as an AP 502 and is labeled in FIG. 5 as a "Beamformer" because the illustrated procedure facilitates the first communication device 502 in developing a transmit beamforming matrix. In other embodiments, the first communication device 502 is a STA or node in a peer-to-peer network, for example. Similarly, merely for illustrative purposes, the second communication devices 504 are referred to below STAs 504 and are labeled in FIG. 5 as "Beamformees" because the illustrated procedure facilitates the first communication device 502 in developing a transmit beamforming matrix for communicating with the second communication devices 504. In other embodiments, however, one of the second communication devices is an AP and/or the second communication devices are nodes in a peer-to-peer network, for example. Although three second communication devices 504-1, 504-2, and 504-3 are illustrated in FIG. 5, other suitable numbers of second communication devices 504 (e.g., 2, 4, 5, etc.) may be employed in other embodiments.

In the example of FIG. 5, AP 502 initiates a training procedure by transmitting, from the AP 502, a null data packet (NDP) announcement message 506. After a SIFS 508, the AP 502 transmits an NDP 510 that includes training signals that are utilized by the STAs 504 to generate channel estimates of respective channels between the AP 502 and the STAs 504. In other embodiments, the AP 502 transmits another suitable PHY data unit that is not an NDP. Thus, in some embodiments, transmission of the NDP announcement message 506 is omitted, and/or another suitable PHY data unit is transmitted instead of the NDP announcement message 506.

The beamformees 504-1, 504-2, and 504-3 each receive the NDP 510, and each develops a respective channel estimate of a respective channel between the AP 502 and the STA 504. In an embodiment, each beamformee 504 generates, based on the developed channel estimate, a beamforming feedback packet. Thus, each beamformee develops the respective beamforming feedback packet based on reception of the NDP 510. In an embodiment, each feedback packet includes an indication of a respective channel estimate. For example, in an embodiment, the feedback packet includes the channel estimate itself. As another example, in an embodiment, the feedback packet includes a compressed form of the channel estimate. In an embodiment, the STA 504 develops, based on the respective channel estimate, a transmit beamforming matrix for use by the AP 502 when transmitting to the STA 504; and the feedback packet includes an indication of the beamforming matrix. For example, in an embodiment, the feedback packet includes the beamforming matrix itself. As another example, in an embodiment, the feedback packet includes a compressed form of the beamforming matrix. As another example, in an embodiment, the feedback packet includes index information to permit the AP 502 to select a suitable beamforming matrix based on performing a lookup operation in a code book using the index.

Each of the STAs 504-1, 504-2, and 504-3 then transmits the respective beamforming feedback packet to the AP 502. For example, after a SIFS 512, the STA 504-1 transmits a beamforming feedback packet 514 to the AP 502 in response to the NDP 510. In an embodiment, the beamforming feedback packet 514 may be in the form of a VHT compressed beamforming report.

After a SIFS 516, the AP 502 may send a request to STA 504-2 in the form of a beamforming report polling signal 518. In response to receiving the beamforming report polling signal 518, the STA 504-2 transmits a beamforming feedback packet 522 to the AP 502 after a further SIFS 520. In an embodiment, the beamforming feedback packet 522 may be in the form of a VHT compressed beamforming report.

After another SIFS 524, the AP 502 may send a request to STA 504-3 in the form of a beamforming report polling signal 526. In response to receiving the beamforming polling signal 526, the STA 504-3 transmit a beamforming feedback packet 530 to the AP 502 after a further SIFS 528. In an embodiment, the beamforming feedback packet 530 may be in the form of a VHT compressed beamforming report.

As discussed above, in some embodiments, the beamforming feedback packets include respective transmit beamforming matrices, respective compressed forms of respective transmit beamforming matrices, respective indices to be used by the AP 502 for looking up the respective transmit beamforming matrices in a table, etc.

In an embodiment, the AP 502 uses the plurality of received beamforming feedback packets to select a group of multiple communication devices (e.g., STAs) for simultaneous uplink (UL) transmissions to the AP 502 and simultaneous downlink (DL) transmission to STAs of the group. Further, the AP 502 may use the plurality of received beamforming feedback packets to generate a transmit beamforming matrix for simultaneous DL transmissions to the second communication devices 504. In an embodiment, the AP 502 selects the group of STAs 504 for multi-user (MU) multiple input, multiple output (MIMO) uplink transmissions and downlink transmissions, referred to herein as a MU-UL group and MU-DL group, respectively. According to an embodiment, a group of STAs can be selected for simultaneous uplink MU transmission and simultaneous downlink transmission such that the selected STAs do not interfere with one another or have relatively low interference with one another. According to an embodiment, determining how much a STA will interfere with other STAs is based on analyzing respective channel information for the STAs (e.g., channel information for channels between each STA and the AP). In an embodiment, the STAs selected for simultaneous uplink and downlink MU transmission are selected to be those STAs that have the same or similar traffic requirements in terms of throughput, service interval, etc.

The MU-UL group may simultaneously transmit to the AP 502 using procedures such as discussed above with respect to FIG. 4, or using other suitable procedures. In some embodiments, STAs in the MU-UL group may each develop a respective transmit beamforming matrix to be utilized when transmitting to the AP 502 as part of a simultaneous UL transmission by the MU-UL group. In some embodiments, the stations 504 develop the transmit beamforming matrices for transmitting to the AP 502 based on channel estimates developed in response to the NDP 510 and using implicit beamforming techniques. In some embodiments, the stations 504 utilize transmit beamforming matrices developed using explicit beamforming techniques. The AP 502 simultaneously transmits downlink beamforming MU MIMO PPDUs to the STAs of the MU-DL group, according to an embodiment.

In a further embodiment, the AP 502 sends a SYNC signal 532 to each of the STAs in the UL group. In this example, the SYNC signal 532 prompts the STAs in the UL group to simultaneously transmit data to the AP 502 at a particular time. In response to receiving the SYNC signal 532, each of STAs in the UL group (i.e., STAs 504-1, 504-2, and 504-3 in this example) simultaneously transmit data 534-1, 534-2, and 534-3, respectively, to the AP 502.

Figure 6:
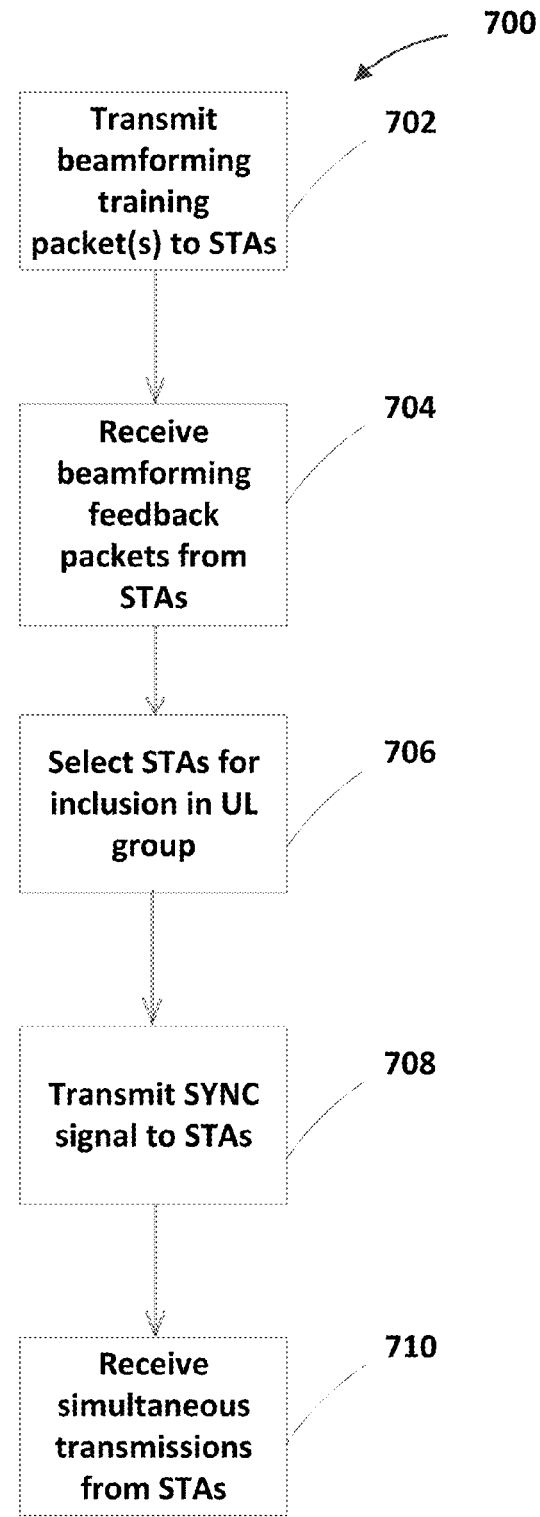
FIG. 6 is a flow diagram illustrating an example method for determining UL transmit beamforming matrices for STAs and for selecting a group of STAs for simultaneous UL transmissions to an AP, according to an embodiment.

FIG. 6 is a flow diagram illustrating an example method 700, implemented by a first communication device, for performing a beamforming training procedure and selecting a group of second communication devices for simultaneous transmissions to the first communication device, according to an embodiment. Merely for explanatory purposes, the method 700 is discussed with reference to FIG. 5. The method 700, however, can be utilized in other scenarios as well. In an embodiment, the method 700 is implemented by the network interface 16 (FIG. 1). In other embodiments, the method 700 is implemented by another suitable communication device. Merely for explanatory purposes, the method 700 is described in the context of the first communication device as an AP and the second communication devices as STAs. In other embodiments, however, the method 700 is implemented by a suitable communication device other than an AP, such as a STA, a node in a peer-to-peer network, etc. Similarly, in some embodiments, the second communication devices include an AP, nodes in a peer-to-peer network, etc.

At block 702 the AP transmits one or more beamforming training packets to a plurality of STAs in a communication network. For example, in FIG. 5, the AP 502 transmits the NDP 510 to the STAs 504. In other embodiments, the AP transmits one or more other suitable beamforming training packets, such as one or more non-NDP packets with suitable training signals.

At block 704, the AP receives beamforming training feedback packets from the STAs. For example, in FIG. 5, the AP 502 receives beamforming training feedback packets 514, 522, and 530. In some embodiments, the method 700 further includes the AP transmitting one or more packets to prompt at least some of the STAs to transmit beamforming training feedback packets. For example, in FIG. 5, the AP 502 transmits polling packets 518 and 526 to prompt STAs 504-2 and 504-3 to transmit beamforming training feedback packets 522 and 530, respectively.

In some embodiments, the beamforming training feedback received at block 704 includes respective channel estimates of respective channels from the AP to the STAs (e.g., the channel estimates themselves, compressed forms of the channel estimates, etc.). In some embodiments, the beamforming training feedback received at block 704 includes indications of respective transmit beamforming matrices (e.g., transmit beamforming matrices themselves, compressed forms of the transmit beamforming matrices, indices to be used for looking up the transmit beamforming matrices in a table, codebook, etc.).

At block 706 the AP selects a group of STAs from the plurality of STAs to be included in the group of STAs for simultaneous transmissions to the AP (the UL group). In an embodiment, the AP selects the UL group for MU MIMO UL transmissions. In an embodiment, the AP selects the UL group based on the beamforming training feedback received at block 704.

At block 708, the AP sends a SYNC signal to prompt the STAs in the UL group to simultaneously transmit data to the AP. For example, in the example of FIG. 5, the AP 502 transmits the SYNC 532. At block 710 the AP receives simultaneous transmissions from the UL group, the simultaneous transmissions being responsive to the SYNC signal transmitted at block 708. In an embodiment, the simultaneous transmissions received at block 710 were transmitted by STAs in the UL group using UL transmit beamforming.

In other embodiments, the method 700 may be modified by including modified blocks, changing the order of blocks, omitting blocks, and/or adding additional blocks. For example, in an embodiment, the method 700 includes the AP selecting a group of STAs from the plurality of STAs to be included in a group of STAs for simultaneous downlink transmissions from the AP to the group of STAs (the DL group). In an embodiment, the AP selects the DL group for MU MIMO DL transmissions. In an embodiment, the AP selects the DL group based on the beamforming training feedback received at block 704. According to an embodiment, a group of STAs can be selected for MU transmission such that DL transmissions to the selected STAs do not interfere with one another or have low interference with one another. According to an embodiment, determining how much a DL transmission to a STA will interfere with DL transmissions other STAs is based on analyzing respective channel information for the STAs (e.g., channel information for channels between the AP and each STA). In an embodiment, the STAs selected for DL MU transmission can be selected to be those that have the same or similar traffic requirements in terms of throughput, service interval, etc.

Figure 7:
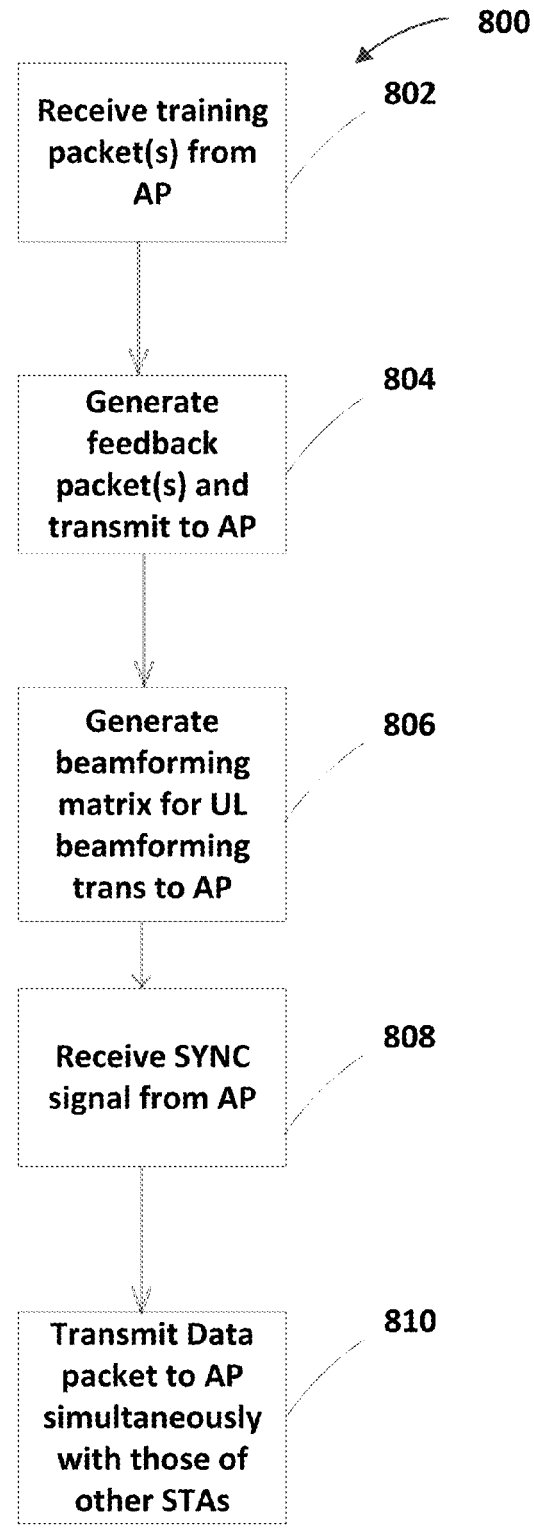
FIG. 7 is a flow diagram illustrating an example method for determining UL transmit beamforming matrices for STAs and for transmitting to an AP as part of a group of STAs that transmit simultaneously to the AP, according to an embodiment.

FIG. 7 is a flow diagram illustrating an example method 800, implemented by a first communication device, for performing a beamforming training procedure and for selection of a group of communication devices for simultaneous transmissions to a second communication device, according to an embodiment. Merely for explanatory purposes, the method 800 is discussed with reference to FIG. 5. The method 800, however, can be utilized in other scenarios as well. In an embodiment, the method 800 is implemented by the network interface 27 (FIG. 1). In other embodiments, the method 800 is implemented by another suitable communication device. Merely for explanatory purposes, the method 800 is described in the context of the first communication device as a STA, the group of communication devices as a group of STAs, and the second communication device as an AP. In other embodiments, however, the method 800 is implemented by a suitable communication device other than a STA, such as an AP, a node in a peer-to-peer network, etc. Similarly, in some embodiments, the group of communication devices includes an AP, nodes in a peer-to-peer network, etc.

In some embodiments, the method 800 is performed in conjunction with the method 700 of FIG. 6. For example, in an embodiment, an AP (or other suitable communication device) performs the method 700 while a STA (or other suitable communication device) performs the method 800. In other embodiments, however, the method 800 is not performed in conjunction with the method 700.

At block 802, a STA receives one or more beamforming training packets from an AP. For example, in the example of FIG. 5, the AP transmits the NDP 510 (or another suitable PPDU having training signals), and the STAs 504 receive the NDP 510.

At block 804 the STA generates a beamforming training feedback packet based on the one or more beamforming training packets received from the AP at block 802. In an embodiment, block 804 includes the STA 504 developing a channel estimate of a channel between the AP 502 and the STA 504. In an embodiment, the STA 504 generates, based on the developed channel estimate, the beamforming feedback packet. Thus, the STA 504 develops the respective beamforming feedback packet based on reception of the beamforming training packet(s) at block 802. In an embodiment, the feedback packet includes an indication of a channel estimate. For example, in an embodiment, the feedback packet includes the channel estimate itself. As another example, in an embodiment, the feedback packet includes a compressed form of the channel estimate. In an embodiment, the STA 504 develops, based on the respective channel estimate, a transmit beamforming matrix for use by the AP 502 when transmitting to the STA 504; and the feedback packet includes an indication of the beamforming matrix. For example, in an embodiment, the feedback packet includes the beamforming matrix itself. As another example, in an embodiment, the feedback packet includes a compressed form of the beamforming matrix. As another example, in an embodiment, the feedback packet includes index information to permit the AP 502 to select a suitable beamforming matrix based on performing a lookup operation in a table, a code book, etc. using the index.

Further at block 804 the STA transmits the feedback packet back to the AP.

At block 806, the STA uses the training packet(s) received from the AP at block 802 to generate a transmit beamforming matrix for UL transmit beamforming transmissions to the AP. In an embodiment, the transmit beamforming matrix generated at block 806 is for use by the STA in simultaneous MU-UL transmissions to the AP. In an embodiment, the STA utilizes implicit beamforming techniques to generate the transmit beamforming matrix at block 806.

At block 808 the STA receives a SYNC signal from the AP. For instance, in the example of FIG. 5, the STAs 504 receive the SYNC 532. At block 810 the STA transmits data to the AP simultaneously with data transmitted to the STA by other STAs in the UL group in response to the SYNC received at block 808. In an embodiment, the SYNC received at block 808 indicates when the STA is to begin transmitting at block 810. In an embodiment, at block 810, the STA uses the beamforming matrix generated at block 806 to transmit the data to the AP using UL beamforming.

In other embodiments, the method 800 may be modified by including modified blocks, changing the order of blocks, omitting blocks, and/or adding additional blocks.

Figure 8:
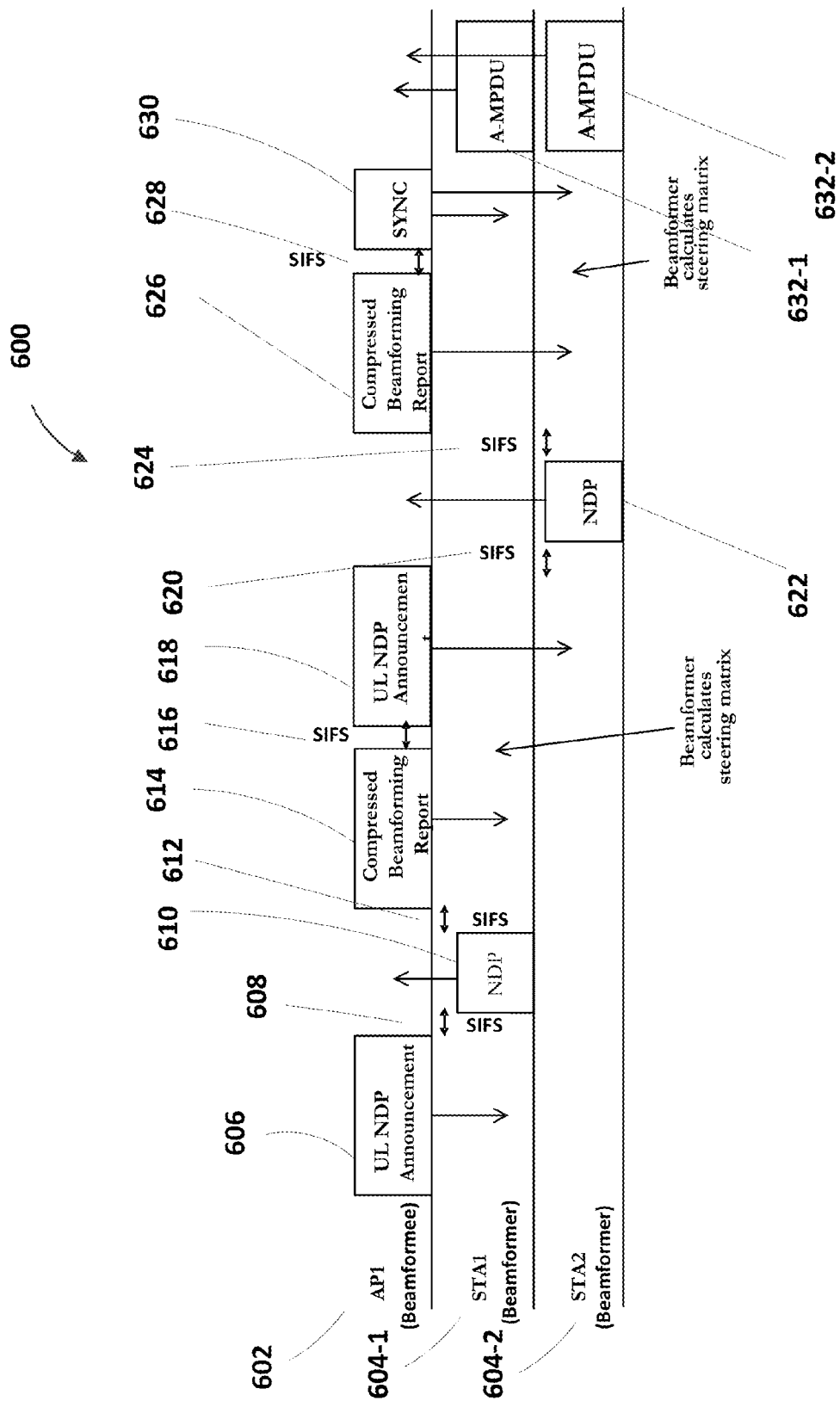
FIG. 8 is a timing diagram illustrating interactions between an AP and a group of STAs as part of a training procedure for determining UL transmit beamforming matrices for STAs and for selecting a group of STAs for simultaneous UL transmissions to the AP, according to an embodiment.

FIG. 8 is schematic timing diagram 600 illustrating example interactions between an AP and a group of STAs as part of a training procedure for i) developing transmit beamforming matrices for use by first communication devices 604, and ii) selecting a group of first communication devices 604 for simultaneous transmission to a second communication device, according to an embodiment. Merely for illustrative purposes, the second communication device 602 is referred to below as an AP 602. In other embodiments, the second communication device 602 is a STA or node in a peer-to-peer network, for example. Similarly, merely for illustrative purposes, the first communication devices 604 are referred to below STAs 604 and are labeled in FIG. 5 as "Beamformers" because the illustrated procedure facilitates the second communication devices 604 in developing transmit beamforming matrices for communicating with the first communication device 602. Similarly, AP 602 is labeled in FIG. 8 as a "Beamformee" because the illustrated procedure facilitates the STAs 604 in developing transmit beamforming matrices for transmitting to the AP 602. In other embodiments, one of the first communication devices 604 is an AP and/or the first communication devices are nodes in a peer-to-peer network, for example. Although two first communication devices 604-1 and 604-2 are illustrated in FIG. 8, other suitable numbers of first communication devices 604 (e.g., 3, 4, 5, etc.) may be employed in other embodiments.

In this example, the AP 602 initiates the training procedure by prompting STAs 604-1 and 604-2 to transmit respective beamforming training packets. In other embodiments, the training procedure is not prompted by the AP 602.

In an embodiment, the AP 602 prompts STAs 604-1 by sending an UL NDP announcement message 606. In response to receiving the UL NDP announcement message 606, STA 604-1 sends a beamforming training packet 610 to the AP 602 after a SIFS 608. In an embodiment, the beamforming training packet 610 is an NDP. In other embodiments, another suitable packet that includes suitable training signals is utilized. In response to receiving the NDP 610, after a SIFS 612, the AP 602 sends a beamforming feedback packet to STA 604-1. In an embodiment, the beamforming feedback packet is a compressed beamforming report 614. In other embodiments, the beamforming feedback packet is another suitable packet including beamforming feedback information. In various embodiments, the beamforming feedback information is as described above such as with reference to FIGS. 5-7.

After sending the beamforming feedback packet 614 to STA 604-1, the AP may sequentially prompt other STAs 604 to transmit beamforming training signals. For example, after a SIFS 616, the AP 602 sends a prompt to STA 604-2 requesting 604-2 to transmit a beamforming training packet to the AP 602, according to an embodiment. For instance, in an embodiment, the AP 602 prompts STA 604-2 by sending an UL NDP announcement message 618.

In response to receiving the UL NDP announcement message 618, STA 604-2 sends a beamforming training packet to the AP 602 after a SIFS 620. In an embodiment, the beamforming training packet is an NDP 622. In other embodiments, another suitable packet that includes suitable training signals is utilized. In response to receiving the NDP 622, after a SIFS 624, the AP 602 sends a beamforming feedback packet to STA 604-2. In an embodiment, the beamforming feedback packet is a compressed beamforming report 626. In other embodiments, the beamforming feedback packet is another suitable packet including beamforming feedback information. In various embodiments, the beamforming feedback information is as described above such as with reference to FIGS. 5-7.

In an embodiment, STAs 604-1 and 604-2 use the results of the received compressed beamforming reports to generate respective transmit beamforming matrices for simultaneous UL transmit beamforming transmissions (e.g., MUMIMO-UL transmissions) to the AP 602.

In an embodiment, the AP 602 selects STAs 604 as the UL group for simultaneous uplink transmissions based on the beamforming training packets received from STAs 604. In an embodiment, the AP 602 selects, based on the beamforming training packets received from STAs 604, STAs as a DL group for simultaneous downlink transmissions from the AP to the DL group, and the AP 602 creates a DL beamforming matrix for simultaneous DL MU beamforming transmissions to the STAs of the DL group. In some embodiments, the DL group is the same as the UL group. In some embodiments, the DL group may be different than the UL group.

In an embodiment, after a SIFS 628, the AP 602 sends a SYNC signal 630 to each of the STAs 604 in the UL group (e.g., STAs 604-1 and 604-2 in this example). In an embodiment, the SYNC signal 630 is transmitted by the AP 602 to STAs 604-1 and 604-2 using DL transmit beamforming. In an embodiment, the SYNC signal 630 prompts the STAs in the UL group to simultaneously transmit data to the AP 602 at a particular time. In response to receiving the SYNC signal

630, each of STAs in the UL group (i.e., STAs 604-1 and 604-2 in this example) simultaneously transmit data 632-1 and 632-2, respectively, to the AP 602 using UL transmit beamforming, according to an embodiment.

Figure 9:
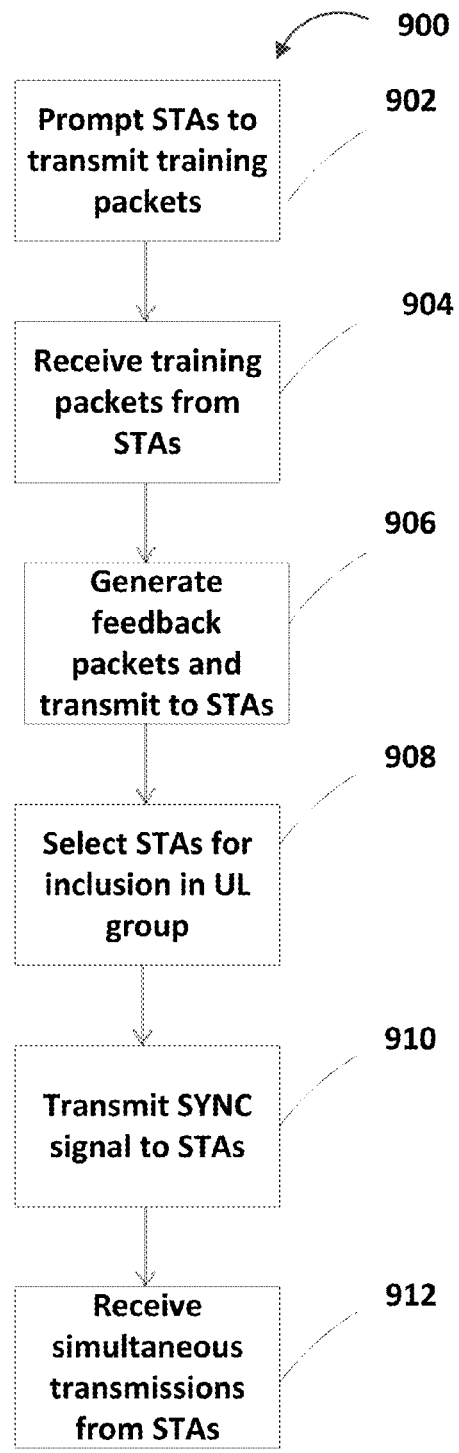
FIG. 9 is a flow diagram illustrating an example method for determining UL transmit beamforming matrices for STAs and for selecting a group of STAs for simultaneous UL transmissions to an AP, according to an embodiment.

FIG. 9 is a flow diagram illustrating an example method 900, implemented by a first communication device, for performing a beamforming training procedure and selecting a group of second communication devices for simultaneous transmissions to the first communication device, according to an embodiment. Merely for explanatory purposes, the method 900 is discussed with reference to FIG. 8. The method 900, however, can be utilized in other scenarios as well. In an embodiment, the method 900 is implemented by the network interface 16 (FIG. 1). In other embodiments, the method 900 is implemented by another suitable communication device. Merely for explanatory purposes, the method 900 is described in the context of the first communication device as an AP and the second communication devices as STAs. In other embodiments, however, the method 900 is implemented by a suitable communication device other than an AP, such as a STA, a node in a peer-to-peer network, etc. Similarly, in some embodiments, the second communication devices include an AP, nodes in a peer-to-peer network, etc.

At block 902, the AP sends one or more messages to a plurality of STAs prompting the plurality of STAs to transmit respective beamforming training packets to the AP. For instance, in the example of FIG. 8, the AP 602 transmits UL NDP announcement packets 606 and 618 to prompt the STA 604-1 and the STA 604-2, respectively, to transmit beamforming training packets to the AP 602. In other embodiments, the AP transmits one or more other suitable packets to prompt the STAs to transmit beamforming training packets to the AP 602. In some embodiments, block 902 is omitted and the STAs transmit beamforming training packets to the AP 602 without being prompted by the AP 602.

At block 904, the AP receives beamforming training packets that were transmitted by the STAs. For instance, in the example of FIG. 8, the AP 602 receives NDP 610 and NDP 622. In other embodiments, the AP receives other suitable packets having suitable beamforming training signals that are not NDP packets.

At block 906, the AP generates respective beamforming training feedback packets based on the beamforming training packets received at block 904. In various embodiments, the beamforming feedback information included in the beamforming training packets is as described above such as with reference to FIGS. 5-7. Block 906 includes determining respective channel estimates of respective channels between the AP and the STAs and generating the feedback information based on the respective channel estimates, according to an embodiment.

Further, at block 906 the beamforming training feedback packets are transmitted to the STAs. For instance, in the example of FIG. 8, the AP 602 transmits compressed beamforming report 614 and compressed beamforming report 626. In other embodiments, the AP transmits other suitable beamforming training feedback packets that are not compressed beamforming report packets.

At block 908 the AP selects a plurality of STAs for inclusion in the UL group based on the beamforming training packets received at block 904.

At block 910 the AP transmits a SYNC signal to the STAs in the UL group. The SYNC signal is utilized to prompt the STAs to simultaneously transmit data to the AP. For instance, in the example of FIG. 8, the AP 602 transmits SYNC 630. At block 912 the AP receives simultaneous transmissions from the STAs in the UL group that are transmitted by the STAs in response to the SYNC signal transmitted at block 910. In some embodiments, the simultaneous transmissions received at block 912 were transmitted by the STAs in the UL group using transmit beamforming matrices generated based on and/or corresponding to the beamforming training feedback packets transmitted to the STAs at block 906.

In other embodiments, the method 900 may be modified by including modified blocks, changing the order of blocks, omitting blocks, and/or adding additional blocks. For example, in some embodiments, the method 900 further includes the AP generates one or more DL transmit beamforming matrices for use in transmitting to STAs based on the beamforming training packets received at block 904. In an embodiment, generating one or more DL transmit beamforming matrices includes determining respective channel estimates of respective channels between the AP and the STAs and generating the one or more DL transmit beamforming matrices based on the respective channel estimates using implicit beamforming techniques, according to an embodiment.

In some embodiments, the method 900 further includes the AP selecting a group of STAs (DL group) for simultaneous DL transmissions by the AP to the DL group, the selection based on the beamforming training packets received at block 904. In an embodiment, selecting the DL group includes determining respective channel estimates of respective channels between the AP and the STAs and determining the DL group based on the respective channel estimates using implicit beamforming techniques, according to an embodiment.

Figure 10:
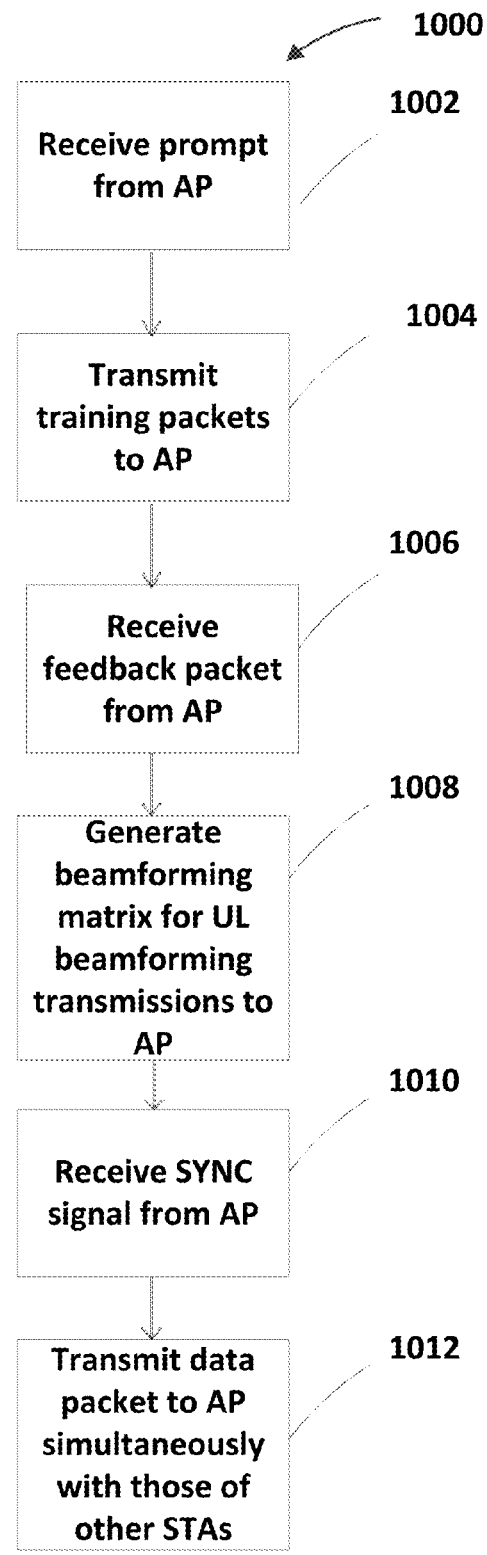
FIG. 10 is a flow diagram illustrating an example method for determining UL transmit beamforming matrices for STAs and for transmitting to an AP as part of a group of STAs that transmit simultaneously to the AP, according to an embodiment.

FIG. 10 is a flow diagram illustrating an example method 1000, implemented by a first communication device, for performing a beamforming training procedure and for selection of a group of communication devices for simultaneous transmissions to a second communication device, according to an embodiment. Merely for explanatory purposes, the method 1000 is discussed with reference to FIG. 8. The method 1000, however, can be utilized in other scenarios as well. In an embodiment, the method 1000 is implemented by the network interface 27 (FIG. 1). In other embodiments, the method 1000 is implemented by another suitable communication device. Merely for explanatory purposes, the method 1000 is described in the context of the first communication device as a STA, the group of communication devices as a group of STAs, and the second communication device as an AP. In other embodiments, however, the method 1000 is implemented by a suitable communication device other than a STA, such as an AP, a node in a peer-to-peer network, etc. Similarly, in some embodiments, the group of communication devices includes an AP, nodes in a peer-to-peer network, etc.

In some embodiments, the method 1000 is performed in conjunction with the method 900 of FIG. 9. For example, in an embodiment, an AP (or other suitable communication device) performs the method 900 while a STA (or other suitable communication device) performs the method 1000. In other embodiments, however, the method 1000 is not performed in conjunction with the method 900.

At block 1002, a STA receives a prompt from the AP. The prompt requests the STA to send a beamforming training packet to the AP. For instance, in the example of FIG. 8, the STA 604-1 receives the UL NDP announcement 606. In other embodiments, however, the STA receives another suitable packet that prompts the STA to send a beamforming training packet to the AP.

At block 1004 the STA transmits a beamforming training packet to the AP in response to receiving the prompt at block 1002. For instance, in the example of FIG. 8, the STA 604-1 transmits the NDP 610 in response to receiving the UL NDP announcement 606. In other embodiments, however, the STA transmits another suitable packet that is not an NDP and that includes suitable beamforming training signals. In some embodiments, the STA transmits a beamforming training packet to the AP without being prompted by the AP.

At block 1006 the STA receives a feedback packet from the AP that was sent by the AP in response to receiving the beamforming training packet transmitted by the STA at block 1004. For instance, in the example of FIG. 8, the STA 604-1 receives the compressed beamforming report 614. In other embodiments, however, the STA receives another suitable packet that is not compressed beamforming report and that includes suitable beamforming feedback information such as described above.

At block 1008 the STA generates a transmit beamforming matrix based on the beamforming feedback packet received from the AP at block 1006. The beamforming matrix may be used by the STA for UL beamforming transmissions to the AP.

At block 1010 the STA receives a SYNC signal from the AP that indicates to the STA when the STA should begin transmitting to the AP as part of a simultaneous UL transmission with other STAs. The SYNC signal instructs the STA to transmit data to the AP at a particular time simultaneously with other STAs that also transmit data to the AP. For instance, in the example of FIG. 8, the STA 604-1 receives the SYNC 630.

At block 1012 the STA transmits, in response to the SYNC signal received at block 1010, data to the AP using UL beamforming simultaneously with other STAs that also use UL beamforming to transmit data to the AP. In an embodiment, the STA begins transmitting at block 1012 at a time indicated by the SYNC signal received at block 1010. For instance, in the example of FIG. 8, the STA 604-1 transmits a packet 632-1 simultaneously with the STA 604-2 transmitting a packet 632-2.

In an embodiment, a method includes transmitting, from a first communication device, a beamforming training packet as part of a beamforming training procedure for developing a transmit beamforming matrix for use by the first communication device; receiving, at the first communication device, a plurality of respective beamforming feedback packets from a plurality of second communication devices, the plurality of beamforming feedback packets being part of the beamforming training procedure for developing the transmit beamforming matrix for use by the first communication device; using, at the first communication device, the plurality of beamforming feedback packets to select a group of multiple communication devices from among the plurality of second communication devices, the group selected for simultaneous transmissions to the first communication device; transmitting, with the first communication device, a synchronization signal to the group to prompt second communication devices in the group to simultaneously transmit to the first communication device at a particular time; and receiving, with the first communication device, simultaneous transmissions from the group responsive to the synchronization signal.

In other embodiments, the method includes one of, or any suitable combination of two or more of, the following elements.

The beamforming training packet is a null data packet (NDP).

The first communication device is an access point; and the plurality of second communication devices are stations associated with the access point.

The group is selected for multi-user (MU) multiple input, multiple output (MIMO) uplink transmissions.

The method further includes transmitting, from the first communication device, one or more polling signals to prompt one or more second communication devices among the plurality of second communication devices to transmit the respective beamforming feedback packets.

In another embodiment, a method includes receiving, at a first communication device, a beamforming training packet transmitted by a second communication device as part of a beamforming training procedure for developing a first transmit beamforming matrix for use by the second communication device; generating, at the first communication device, a beamforming feedback packet based on reception of the beamforming training packet; transmitting, from the first communication device, the beamforming feedback packet as part of the beamforming training procedure for developing the first transmit beamforming matrix for use by the second communication device; generating, at the first communication device, a second beamforming matrix for use by the first communication device when transmitting to the second communication device simultaneously with one or more third communication devices transmitting to the second communication device; receiving, at the first communication device, a synchronization signal transmitted, by the second communication device, to a group of communication devices to prompt communication devices in the group to simultaneously transmit to the second communication device at a particular time, wherein the group comprises the first communication device and the one or more third communication devices; and transmitting, with the first communication device, a data packet to the second communication device simultaneous with transmissions by the one or more third communication devices to the second communication device, wherein transmission of the data packet and the transmissions by the one or more third communication devices are responsive to the synchronization signal.

In other embodiments, the method includes one of, or any suitable combination of two or more of, the following elements.

The beamforming training packet is a null data packet (NDP).

The second communication device is an access point; and i) the first communication device and ii) the one or more third communication devices are stations associated with the access point.

The group is selected for multi-user (MU) multiple input, multiple output (MIMO) uplink transmissions; and i) transmitting a data packet to the second communication device and ii) the transmissions by the one or more third communication devices are part of a MU MIMO uplink transmission.

The method further includes receiving, at the first communication device, a polling signal transmitted by the second communication device, wherein transmitting the beamforming feedback packet is responsive to the polling signal.

In yet another embodiment, a method includes prompting, at a first communication device, a plurality of second communication devices to transmit, to the first communication device, respective beamforming training packets as part of a procedure for developing respective transmit beamforming matrices for use by the plurality of second communication devices; receiving, at the first communication device, the respective beamforming training packets; generating, at the first communication device, respective beamforming feedback packets based on reception of the respective beamforming training packets; transmitting, from the first communication device, the beamforming feedback packet as part of the beamforming training procedure for developing the first transmit beamforming matrix for use by the second communication device; selecting, at the first communication device, a group of multiple second communication devices from among the plurality of second communication devices, the group selected for simultaneous transmissions to the first communication device; transmitting, with the first communication device, a synchronization signal to the group to prompt second communication devices in the group to simultaneously transmit to the first communication device at a particular time; and receiving, with the first communication device, simultaneous transmissions from the group responsive to the synchronization signal, the simultaneous transmissions having been beamformed by second communication devices in the group using transmit beamforming matrices developed by the second communication devices in the group as part of the procedure for developing respective transmit beamforming matrices for use by the plurality of second communication devices.

In other embodiments, the method includes one of, or any suitable combination of two or more of, the following elements.

Each beamforming training packet is a null data packet (NDP).

The first communication device is an access point; and the plurality of second communication devices are stations associated with the access point.

The group is selected for multi-user (MU) multiple input, multiple output (MIMO) uplink transmissions.

Prompting the plurality of second communication devices to transmit respective beamforming training packets comprises transmitting respective packets to second communication devices in the plurality of second communication devices to individually prompt second communication devices in the plurality of second communication devices to transmit respective beamforming training packets.

In still another embodiment, a method includes receiving, at a first communication device, a prompt, from a second communication device, to transmit a beamforming training packet to the second communication device as part of a beamforming training procedure for developing a transmit beamforming matrix for use by the first communication device when transmitting to the second communication device simultaneously with one or more third communication devices transmitting to the second communication device; in response to the prompt, transmitting the beamforming training packet to the second communication device; receiving, from the second communication device, a beamforming feedback packet as part of the beamforming training procedure; generating, at the first communication device, a transmit beamforming matrix for use by the first communication device when transmitting to the second communication device simultaneously with the one or more third communication devices transmitting to the second communication device; receiving, at the first communication device, a synchronization signal transmitted, by the second communication device, to a group of communication devices to prompt communication devices in the group to simultaneously transmit to the second communication device at a particular time, wherein the group comprises the first communication device and the one or more third communication devices; and transmitting, with the first communication device, a data packet to the second communication device simultaneous with transmissions by the one or more third communication devices to the second communication device, wherein transmission of the data packet includes utilizing the transmit beamforming matrix, and transmission of the data packet and the transmissions by the one or more third communication devices are responsive to the synchronization signal.

In other embodiments, the method includes one of, or any suitable combination of two or more of, the following elements.

The beamforming training packet is a null data packet (NDP).

The second communication device is an access point; and i) the first communication device and ii) the one or more third communication devices are stations associated with the access point.

The group is selected for multi-user (MU) multiple input, multiple output (MIMO) uplink transmissions; and i) transmitting the data packet to the second communication device and ii) the transmissions by the one or more third communication devices are part of a MU MIMO uplink transmission.

The method further includes receiving, at the first communication device, a polling signal transmitted by the second communication device, wherein transmitting the beamforming training packet is responsive to the polling signal.

In another embodiment, an apparatus comprises a first communication device and a plurality of second communication devices having one or more integrated circuit devices configured to perform the following operations: transmitting, from the first communication device, a beamforming training packet as part of a beamforming training procedure for developing a transmit beamforming matrix for use by the first communication device; receiving, at the first communication device, a plurality of respective beamforming feedback packets from the plurality of second communication devices, the plurality of beamforming feedback packets being part of the beamforming training procedure for developing the transmit beamforming matrix for use by the first communication device; using, at the first communication device, the plurality of beamforming feedback packets to select a group of multiple communication devices from among the plurality of second communication devices, the group selected for simultaneous transmissions to the first communication device; transmitting, with the first communication device, a synchronization signal to the group to prompt second communication devices in the group to simultaneously transmit to the first communication device at a particular time; and receiving, with the first communication device, simultaneous transmissions from the group responsive to the synchronization signal.

In other embodiments, the apparatus includes one of, or any suitable combination of two or more of, the following elements.

The beamforming training packet is a null data packet (NDP).

The first communication device is an access point; and the plurality of second communication devices are stations associated with the access point.

The group is selected for multi-user (MU) multiple input, multiple output (MIMO) uplink transmissions.

The one or more integrated circuit devices are further configured to transmit, from the first communication device, one or more polling signals to prompt one or more second communication devices among the plurality of second communication devices to transmit the respective beamforming feedback packets.

In yet another embodiment, an apparatus comprises a first communication device and a plurality of second communication devices having one or more integrated circuit devices configured to perform the following operations: receiving, at the first communication device, a beamforming training packet transmitted by the second communication device as part of a beamforming training procedure for developing a first transmit beamforming matrix for use by the second communication device; generating, at the first communication device, a beamforming feedback packet based on reception of the beamforming training packet; transmitting, from the first communication device, the beamforming feedback packet as part of the beamforming training procedure for developing the first transmit beamforming matrix for use by the second communication device; generating, at the first communication device, a second beamforming matrix for use by the first communication device when transmitting to the second communication device simultaneously with one or more third communication devices transmitting to the second communication device; receiving, at the first communication device, a synchronization signal transmitted, by the second communication device, to a group of communication devices to prompt communication devices in the group to simultaneously transmit to the second communication device at a particular time, wherein the group comprises the first communication device and the one or more third communication devices; and transmitting, with the first communication device, a data packet to the second communication device simultaneous with transmissions by the one or more third communication devices to the second communication device, wherein transmission of the data packet and the transmissions by the one or more third communication devices are responsive to the synchronization signal.

In other embodiments, the apparatus includes one of, or any suitable combination of two or more of, the following elements.

The beamforming training packet is a null data packet (NDP).

The second communication device is an access point; and i) the first communication device and ii) the one or more third communication devices are stations associated with the access point.

The group is selected for multi-user (MU) multiple input, multiple output (MIMO) uplink transmissions; and i) transmitting a data packet to the second communication device and ii) the transmissions by the one or more third communication devices are part of a MU MIMO uplink transmission.

The one or more integrated circuit devices are further configured to perform the following operations: receiving, at the first communication device, a polling signal transmitted by the second communication device, wherein transmitting the beamforming feedback packet is responsive to the polling signal.

In still another embodiment, an apparatus comprises a first communication device and a plurality of second communication devices having one or more integrated circuit devices configured to perform the following operations: prompting, at the first communication device, the plurality of second communication devices to transmit, to the first communication device, respective beamforming training packets as part of a procedure for developing respective transmit beamforming matrices for use by the plurality of second communication devices; receiving, at the first communication device, the respective beamforming training packets; generating, at the first communication device, respective beamforming feedback packets based on reception of the respective beamforming training packets; transmitting, from the first communication device, the beamforming feedback packet as part of the beamforming training procedure for developing the first transmit beamforming matrix for use by the second communication device; selecting, at the first communication device, a group of multiple second communication devices from among the plurality of second communication devices, the group selected for simultaneous transmissions to the first communication device; transmitting, with the first communication device, a synchronization signal to the group to prompt second communication devices in the group to simultaneously transmit to the first communication device at a particular time; and receiving, with the first communication device, simultaneous transmissions from the group responsive to the synchronization signal, the simultaneous transmissions having been beamformed by second communication devices in the group using transmit beamforming matrices developed by the second communication devices in the group as part of the procedure for developing respective transmit beamforming matrices for use by the plurality of second communication devices.

Each beamforming training packet is a null data packet (NDP).

The first communication device is an access point; and the plurality of second communication devices are stations associated with the access point.

The group is selected for multi-user (MU) multiple input, multiple output (MIMO) uplink transmissions.

Prompting the plurality of second communication devices to transmit respective beamforming training packets comprises transmitting respective packets to second communication devices in the plurality of second communication devices to individually prompt second communication devices in the plurality of second communication devices to transmit respective beamforming training packets.

In another embodiment, an apparatus comprises a first communication device and a plurality of second communication devices having one or more integrated circuit devices configured to perform the following operations: receiving, at the first communication device, a prompt, from one of the second communication devices, to transmit a beamforming training packet to the second communication device as part of a beamforming training procedure for developing a transmit beamforming matrix for use by the first communication device when transmitting to the second communication device simultaneously with one or more third communication devices transmitting to the second communication device; in response to the prompt, transmitting the beamforming training packet to the second communication device; receiving, from the second communication device, a beamforming feedback packet as part of the beamforming training procedure; generating, at the first communication device, a transmit beamforming matrix for use by the first communication device when transmitting to the second communication device simultaneously with the one or more third communication devices transmitting to the second communication device; receiving, at the first communication device, a synchronization signal transmitted, by the second communication device, to a group of communication devices to prompt communication devices in the group to simultaneously transmit to the second communication device at a particular time, wherein the group comprises the first communication device and the one or more third communication devices; and transmitting, with the first communication device, a data packet to the second communication device simultaneous with transmissions by the one or more third communication devices to the second communication device, wherein transmission of the data packet includes utilizing the transmit beamforming matrix, and transmission of the data packet and the transmissions by the one or more third communication devices are responsive to the synchronization signal.

In other embodiments, the apparatus includes one of, or any suitable combination of two or more of, the following elements.

The beamforming training packet is a null data packet (NDP).

The second communication device is an access point; and i) the first communication device and ii) the one or more third communication devices are stations associated with the access point.

The group is selected for multi-user (MU) multiple input, multiple output (MIMO) uplink transmissions; and i) transmitting the data packet to the second communication device and ii) the transmissions by the one or more third communication devices are part of a MU MIMO uplink transmission.

The one or more integrated circuit devices are further configured to perform the following operations: receiving, at the first communication device, a polling signal transmitted by the second communication device, wherein transmitting the beamforming training packet is responsive to the polling signal.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any tangible, non-transitory computer readable memory such as on a magnetic disk, an optical disk, or other storage medium, in a RAM or ROM or flash memory, processor, hard disk drive, optical disk drive, tape drive, etc.

When implemented in hardware, the hardware may comprise one or more of discrete components, an integrated circuit, an application-specific integrated circuit (ASICS), a programmable logic device, etc.

Embodiments of the present disclosure may be embodied in any type of network interface device used in a communication system including, for example, devices used in communication systems including or coupled to a wired or wireless local area network (LAN) or a wired or wireless wide area network (WAN), the Internet, cable and/or satellite based communication systems, etc.

While the present invention has been described with reference to specific examples, which are intended to be illustrative only and not to be limiting of the invention, changes, additions and/or deletions may be made to the disclosed embodiments without departing from the scope of the claims.

What is claimed is:

1. A method, comprising:
  prompting, at a first communication device, a plurality of second communication devices to transmit, to the first communication device, respective beamforming training packets as part of a procedure for developing respective transmit beamforming matrices for use by the plurality of second communication devices;
  receiving, at the first communication device, the respective beamforming training packets as part of the procedure for developing the respective transmit beamforming matrices, the respective beamforming training packets having been transmitted by the plurality of second communication devices in response to the prompting;
  generating, at the first communication device, respective beamforming feedback packets based on reception of the respective beamforming training packets;
  transmitting, from the first communication device, the respective beamforming feedback packets as part of the procedure for developing the respective transmit beamforming matrices;
  selecting, at the first communication device, a group of multiple second communication devices from among the plurality of second communication devices using channel information developed based on reception of the respective beamforming training packets, the group selected for simultaneous transmissions to the first communication device;
  transmitting, with the first communication device, a synchronization signal to the group to prompt second communication devices in the group to simultaneously transmit to the first communication device at a particular time; and
  receiving, with the first communication device, simultaneous transmissions from the group responsive to the synchronization signal, the simultaneous transmissions having been beamformed by second communication devices in the group using transmit beamforming matrices developed by the second communication devices in the group as part of the procedure for developing respective transmit beamforming matrices for use by the plurality of second communication devices.

2. The method of claim 1, wherein each beamforming training packet is a null data packet (NDP).

3. The method of claim 1, wherein:
  the first communication device is an access point; and
  the plurality of second communication devices are stations associated with the access point.

4. The method of claim 1, wherein the group is selected for multi-user (MU) multiple input, multiple output (MIMO) uplink transmissions.

5. The method of claim 1, wherein prompting the plurality of second communication devices to transmit respective beamforming training packets comprises transmitting respective packets to second communication devices in the plurality of second communication devices to individually prompt second communication devices in the plurality of second communication devices to transmit respective beamforming training packets.

6. An apparatus, comprising:
  a network interface device of a first communication device, the network interface device having one or more integrated circuit devices configured to:
    prompt a plurality of second communication devices to transmit, to the first communication device, respective beamforming training packets as part of a procedure for developing respective transmit beamforming matrices for use by the plurality of second communication devices,
    receive the respective beamforming training packets transmitted by the plurality of second communication devices as part of the procedure for developing the respective transmit beamforming matrices and in response to the prompt,
    generate respective beamforming feedback packets based on reception of the respective beamforming training packets,
    transmit the respective beamforming feedback packets as part of the procedure for developing the respective transmit beamforming matrices,
    select a group of multiple second communication devices from among the plurality of second communication devices using channel information developed based on reception of the respective beamforming training packets, the group selected for simultaneous transmissions to the first communication device, transmit a synchronization signal to the group to prompt second communication devices in the group to simultaneously transmit to the first communication device at a particular time, and receive simultaneous transmissions from the group responsive to the synchronization signal, the simultaneous transmissions having been beamformed by second communication devices in the group using transmit beamforming matrices developed by the second communication devices in the group as part of the procedure for developing respective transmit beamforming matrices for use by the plurality of second communication devices.

7. The apparatus of claim 6, wherein each beamforming training packet is a null data packet (NDP).

8. The apparatus of claim 6, wherein:
the first communication device is an access point; and
the plurality of second communication devices are stations associated with the access point.

9. The apparatus of claim 6, wherein the one or more integrated circuit devices are configured to select the group for multi-user (MU) multiple input, multiple output (MIMO) uplink transmissions.

10. The apparatus of claim 6, wherein the one or more integrated circuit devices are configured to prompt the plurality of second communication devices to transmit respective beamforming training packets by transmitting respective packets to second communication devices in the plurality of second communication devices to individually prompt second communication devices in the plurality of second communication devices to transmit respective beamforming training packets.

11. An apparatus, comprising:
a network interface device of a first communication device, the network interface device having one or more integrated circuit devices configured to:
receive a prompt from a second communication device, the prompt for the first communication device to transmit a beamforming training packet to the second communication device as part of a beamforming training procedure for developing a transmit beamforming matrix for use by the first communication device when transmitting to the second communication device simultaneously with one or more third communication devices transmitting to the second communication device,
in response to the prompt, transmit the beamforming training packet to the second communication device as part of the beamforming training procedure,
receiving, from the second communication device, a beamforming feedback packet as part of the beamforming training procedure,
generate a transmit beamforming matrix for use by the first communication device when transmitting to the second communication device simultaneously with the one or more third communication devices transmitting to the second communication device,
receive a synchronization signal transmitted, by the second communication device, to a group of communication devices to prompt communication devices in the group to simultaneously transmit to the second communication device at a particular time, wherein the group comprises the first communication device and the one or more third communication devices, and
transmit a data packet to the second communication device simultaneous with transmissions by the one or more third communication devices to the second communication device, wherein
transmission of the data packet includes utilizing the transmit beamforming matrix, and
transmission of the data packet and the transmissions by the one or more third communication devices are responsive to the synchronization signal.

12. The apparatus of claim 11, wherein the beamforming training packet is a null data packet (NDP).

13. The apparatus of claim 11, wherein:
the second communication device is an access point; and
i) the first communication device and ii) the one or more third communication devices are stations associated with the access point.

14. The apparatus of claim 11, wherein:
the group is selected for multi-user (MU) multiple input, multiple output (MIMO) uplink transmissions; and
the one or more integrated circuit devices are configured to transmit the data packet to the second communication device as part of a MU MIMO uplink transmission that includes the transmissions by the one or more third communication devices.

15. The apparatus of claim 11, wherein the one or more integrated circuit devices are further configured to:
receive a polling signal transmitted by the second communication device; and
transmit the beamforming training packet in responsive to the polling signal.

16. An apparatus, comprising:
a network interface device of a first communication device, the network interface device having one or more integrated circuit devices configured to:
transmit a beamforming training packet as part of a beamforming training procedure for developing a transmit beamforming matrix for use by the first communication device,
receive a plurality of respective beamforming feedback packets from a plurality of second communication devices, the plurality of beamforming feedback packets being part of the beamforming training procedure for developing the transmit beamforming matrix for use by the first communication device,
use the plurality of beamforming feedback packets to select a group of multiple communication devices from among the plurality of second communication devices, the group selected for simultaneous transmissions to the first communication device,
transmit a synchronization signal to the group to prompt second communication devices in the group to simultaneously transmit to the first communication device at a particular time, and
receive simultaneous transmissions from the group responsive to the synchronization signal.

17. The apparatus of claim 16, wherein the beamforming training packet is a null data packet (NDP).

18. The apparatus of claim 16, wherein:
the first communication device is an access point; and
the plurality of second communication devices are stations associated with the access point.

19. The apparatus of claim 16, wherein the group is selected for multi-user (MU) multiple input, multiple output (MIMO) uplink transmissions.

20. The apparatus of claim 16, wherein the one or more integrated circuit devices are further configured to transmit, from the first communication device, one or more polling signals to prompt one or more second communication devices among the plurality of second communication devices to transmit the respective beamforming feedback packets.

21. An apparatus, comprising:
a network interface device of a first communication device, the network interface device having one or more integrated circuit devices configured to:
receive a beamforming training packet transmitted by a second communication device as part of a beamforming training procedure for developing a first transmit beamforming matrix for use by the second communication device,
generate a beamforming feedback packet based on reception of the beamforming training packet,
transmit the beamforming feedback packet as part of the beamforming training procedure for developing the first transmit beamforming matrix for use by the second communication device,
generate a second beamforming matrix for use by the first communication device when transmitting to the second communication device simultaneously with one or more third communication devices transmitting to the second communication device,
receive a synchronization signal transmitted, by the second communication device, to a group of communication devices to prompt communication devices in the group to simultaneously transmit to the second communication device at a particular time, wherein the group comprises the first communication device and the one or more third communication devices, and
transmit a data packet to the second communication device simultaneous with transmissions by the one or more third communication devices to the second communication device, wherein
transmission of the data packet is responsive to the synchronization signal, and
the network interface device utilizes the second beamforming matrix when transmitting the data packet.

22. The apparatus of claim 21, wherein the beamforming training packet is a null data packet (NDP).

23. The apparatus of claim 21, wherein:
the second communication device is an access point; and
i) the first communication device and ii) the one or more third communication devices are stations associated with the access point.

24. The apparatus of claim 21, wherein:
the group is selected for multi-user (MU) multiple input, multiple output (MIMO) uplink transmissions; and
i) transmitting a data packet to the second communication device and ii) the transmissions by the one or more third communication devices are part of a MU MIMO uplink transmission.

25. The apparatus of claim 21, wherein the one or more integrated circuit devices are further configured to:
receive a polling signal transmitted by the second communication device; and
transmit the beamforming feedback packet in response to the polling signal.

* * * * *